US006299410B1

United States Patent
Hilbert et al.

(12) United States Patent
(10) Patent No.: US 6,299,410 B1
(45) Date of Patent: Oct. 9, 2001

(54) METHOD AND APPARATUS FOR DAMPING VIBRATION IN TURBOMACHINE COMPONENTS

(75) Inventors: Gary R. Hilbert, Marlborough; David D. Pearson, West Hartford, both of CT (US); Edward F. Crawley, Cambridge, MA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/502,443

(22) Filed: Feb. 23, 1999

Related U.S. Application Data

(63) Continuation of application No. 08/998,446, filed on Dec. 26, 1997.

(51) Int. Cl.[7] .............................. F01D 5/00; B64C 27/00
(52) U.S. Cl. .................. 416/145; 416/500; 415/119; 415/10; 415/14
(58) Field of Search .................. 415/1, 119, 10, 415/14; 416/145, 144, 500, 248

(56) References Cited

U.S. PATENT DOCUMENTS

| | | |
|---|---|---|
| 3,398,535 | 8/1968 | Campbell et al. . |
| 3,477,231 | 11/1969 | Paulson . |
| 3,611,724 | 10/1971 | Kutney . |
| 3,652,184 | 3/1972 | Conrad . |

(List continued on next page.)

FOREIGN PATENT DOCUMENTS

| | | |
|---|---|---|
| 0 715 092 | 6/1996 | (EP) . |
| 4-312236 | 11/1992 | (JP) . |
| 8-159212 | 6/1996 | (JP) . |
| WO 95/2087 | 8/1995 | (WO) . |

OTHER PUBLICATIONS

Proctor, Paul, , "Solid State Rotor Tested", *Aviation Week & Space Technology,* Apr. 15, 1996, p. 46.
Active Control eXperts, Inc., "The Brains Inside the Ski", *The ACX Piezo Control Module* (brochure) 1995.
Crawley, Edward F., "Intelligent Structures—A Technology Overview and Assessment", *AGARD Smart Structures for Aircraft and Spacecraft* (AGARD Conference Proceedings 531), pp. 6.1–6.16.

(List continued on next page.)

*Primary Examiner*—Christopher Verdier
*Assistant Examiner*—Richard Woo

(57) ABSTRACT

A method and apparatus reduces the magnitude of vibratory strain in a turbomachine component that experiences high steady state strain by, in the case of a passive embodiment, coupling a mechanical-to-electromagnetic energy converter to an interior and/or exterior surface of the component, and/or embedding the energy converter within the component, and by, in the case of an active embodiment, coupling a mechanical-to-electromagnetic energy converter to an interior and/or exterior surface of the component.

45 Claims, 11 Drawing Sheets

U.S. PATENT DOCUMENTS

| | | | |
|---|---|---|---|
| 3,991,849 | 11/1976 | Green et al. | 415/119 |
| 4,155,221 | 5/1979 | Dhoore et al. | 415/119 |
| 4,491,761 | 1/1985 | Grudkowski et al. . | |
| 4,518,888 | 5/1985 | Zabeik . | |
| 4,759,513 | 7/1988 | Birbragher . | |
| 4,836,469 | 6/1989 | Wagenfeld . | |
| 4,849,668 | 7/1989 | Crawley et al. | 310/326 |
| 4,883,248 | 11/1989 | Uchino et al. . | |
| 4,967,550 | 11/1990 | Acton et al. | 415/119 |
| 5,025,888 | 6/1991 | Arcas et al. . | |
| 5,052,529 | 10/1991 | Sutcliffe et al. . | |
| 5,102,298 | 4/1992 | Kreitmeier . | |
| 5,141,392 | 8/1992 | Uvemo . | |
| 5,169,288 | 12/1992 | Gliebe et al. | 415/119 |
| 5,195,046 | 3/1993 | Gerardi et al. . | |
| 5,242,130 | 9/1993 | Mouille et al. | 416/500 |
| 5,270,607 * | 12/1993 | Terajima | 310/316 |
| 5,315,203 * | 5/1994 | Bicos | 310/326 |
| 5,348,124 | 9/1994 | Harper . | |
| 5,370,340 | 12/1994 | Pla . | |
| 5,374,011 | 12/1994 | Lazarus et al. . | |
| 5,411,370 | 5/1995 | Varsik | 415/119 |
| 5,423,658 | 6/1995 | Pla et al. | 415/119 |
| 5,478,199 | 12/1995 | Gliebe | 415/119 |
| 5,485,053 * | 1/1996 | Baz | 310/326 |
| 5,515,458 | 5/1996 | Ide . | |
| 5,541,857 | 7/1996 | Walter et al. . | |
| 6,076,776 * | 6/2000 | Breitbach et al. | 244/219 |
| 6,102,426 * | 8/2000 | Lazarus et al. | 280/602 |

OTHER PUBLICATIONS

Proctor, Paul, "Industry Outlook", *Aviation Week & Space Technology*, May 8, 1995, p. 13.

Olson, Harry F., "Electronic Control of Noise, Vibration and Reverbration", *The Journal of the Acoustical Society of America*, vol. 28, No. 5, Sep. 1956, pp. 966–972.

Hagood, N.W. et al., "Damping of Structural Vibrations with Piezoelectric Materials and Passive electrical Networks", *Journal of Sound and Vibrations*, 146(2), 1991, pp. 243–268.

Wu, Shu–yau, "Piezoelectric Shunts with a Parallel R–L Circuit for Structural Damping and Vibration Control", McDonnell Douglas Aerospace Company, research paper, pp. 1–11.

Aldrich, Jack B. et al., "Design of Passive Piezoelectric Damping for Space Structures", *SPIE*, vol. 1917, Smart Structures and Intelligent Systems, 1993.

Kurtz, S.K., "Passive Vibration Damping", *Annual Performance Technical Report*, Penn State University, Jan. 1991, 17 pgs.

Hayek, S.I., "Damping Properties of Lanxide Materials", Penn State University.

Kurtz, Stewart et al., "Passive Vibration Damping Materials: Piezoelectric Ceramic Composites for Vibration Damping Application", *Annual Report*, Penn State University, Jun. 1992.

Lesieutre, G.A. et al., "Frequency–Shaped Passive Damping Using Resistively–Shunted Piezoceramics", Conference on Active Materials and Structures, Nov. 1991.

Yoshikawa, S. et al., "Passive Piezoelectric Damping Composites", *ASM International Materials Week* (abstract), 1991.

Kurtz, Stewart et al., "Passive Vibration Damping Materials: Piezoelectric Ceramic Composites for Vibration Damping Application", *Annual Technical Report*, Penn State University, Feb. 1993.

Yoshikawa, S., et al.,, "Piezoelectric PZT Tubes and Fibers for Passive Vibrational Damping", IEEE $8^{th}$ International Symposium on Application of Ferroelectric, 1992, 4pgs.

Lesieutre, G.A. et al., "Resistively–Shunted Pieroceramics for Passively–Damped Structural Composite Materials" International Symposium on Damping of Multiphase Inorganic Materials, Nov. 1992.

Yoshikawa, S., "Passive Vibration Damping Materials: Piezoelectric Ceramic Composites for Vibration Damping Application",Annual Technical Report, Penn State University, Feb. 1994.

Lesieutre, G.A. et al., "Passively Damped Structural Composite Materials Using Resistively Shunted Piezoceramic" *Journal of Materials Engineering and Performance*, vol. 2(6) Dec. 1993.

Shen, I.Y., "Bending–Vibration Control of Composite and Isotropic Plates Through Intelligent Constrained–Layer Treatments", *Smart Material Structure*, 3, 1994, pp. 59–70.

Koshigoe, S. et al., "A Unified Analysis of Both Active and Passive Damping for a Plate with Piezoelectric Transducers" *Journal of Acoustical Society of America*, 1993.

Yoshikawa, S. et al., "Pb(Zr, Ti)O3 [PZT] Fibers–Fabrication and Measurement Methods" *ASME Annual Winter Meeting Manufacturing of Active Materials*, 1993, pp. 18–25.

Morse, D., "Clink! High–Tech Bat Swings for Fences", *Wall Street Journal*.

Fulton, Graham B. et al., "Transonic Aeromechanic Response of a Rotating Annular Cascade", Final Report, UTRC, 1992.

Lazarus, K. et al., "Multivariable High–Authority Control of Plate–Like Active Structures", AIAA, paper No. 92–2529, 1992.

Active Control eXperts, Inc., "Smart Materials, Product Design, Manufacturing" Active Control eXperts, 1994.

European Search Report (EP 98 31 0736)

* cited by examiner

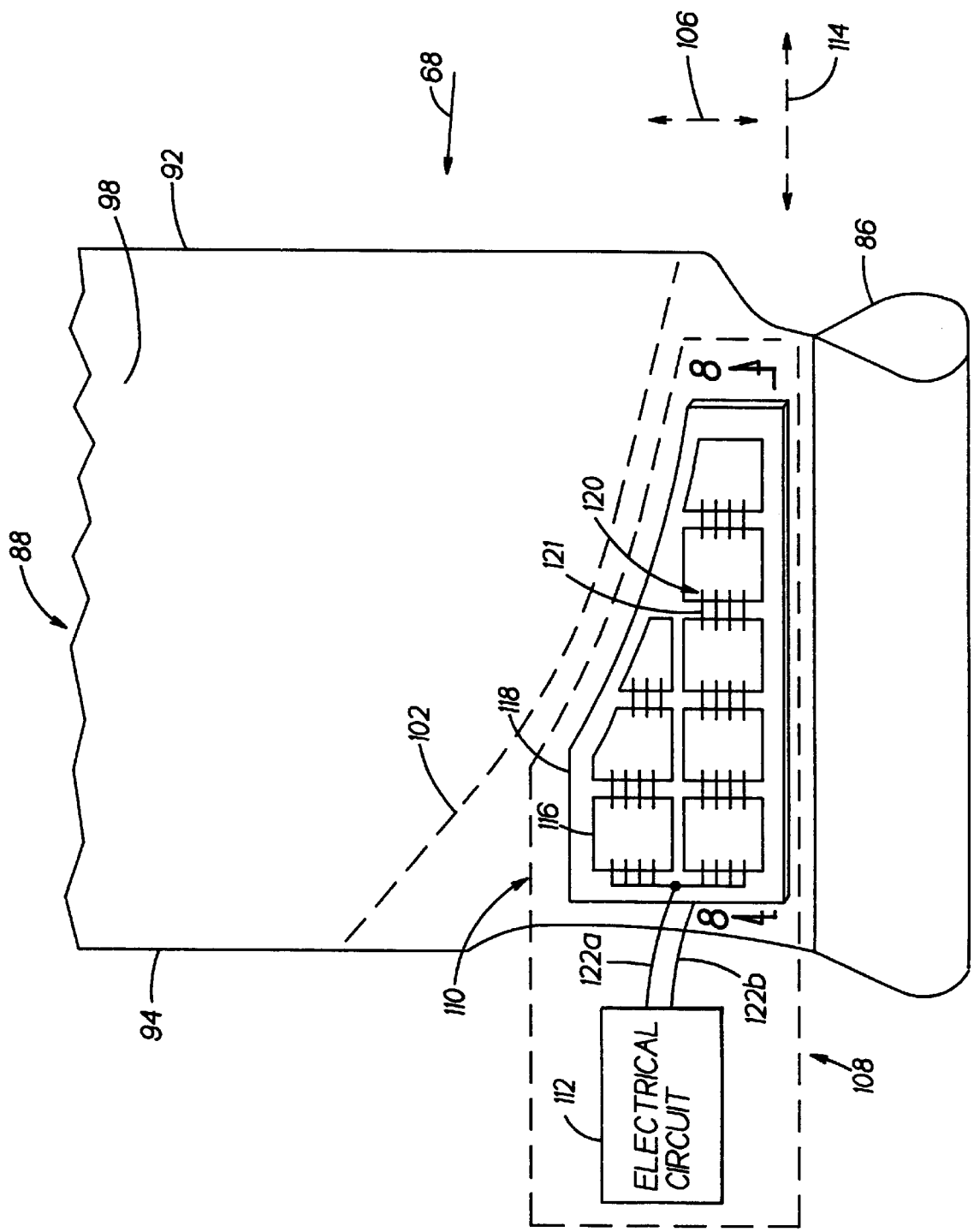

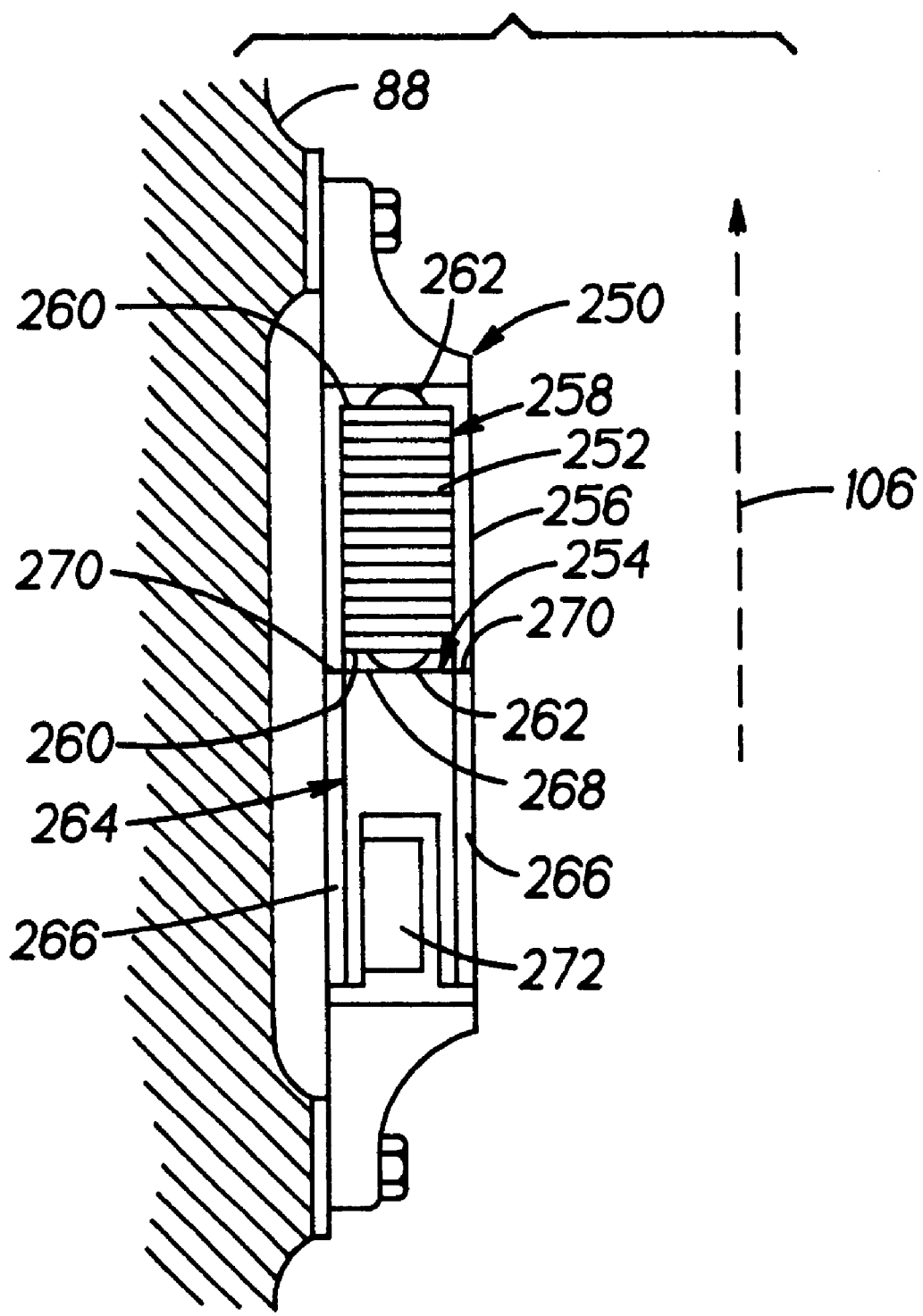

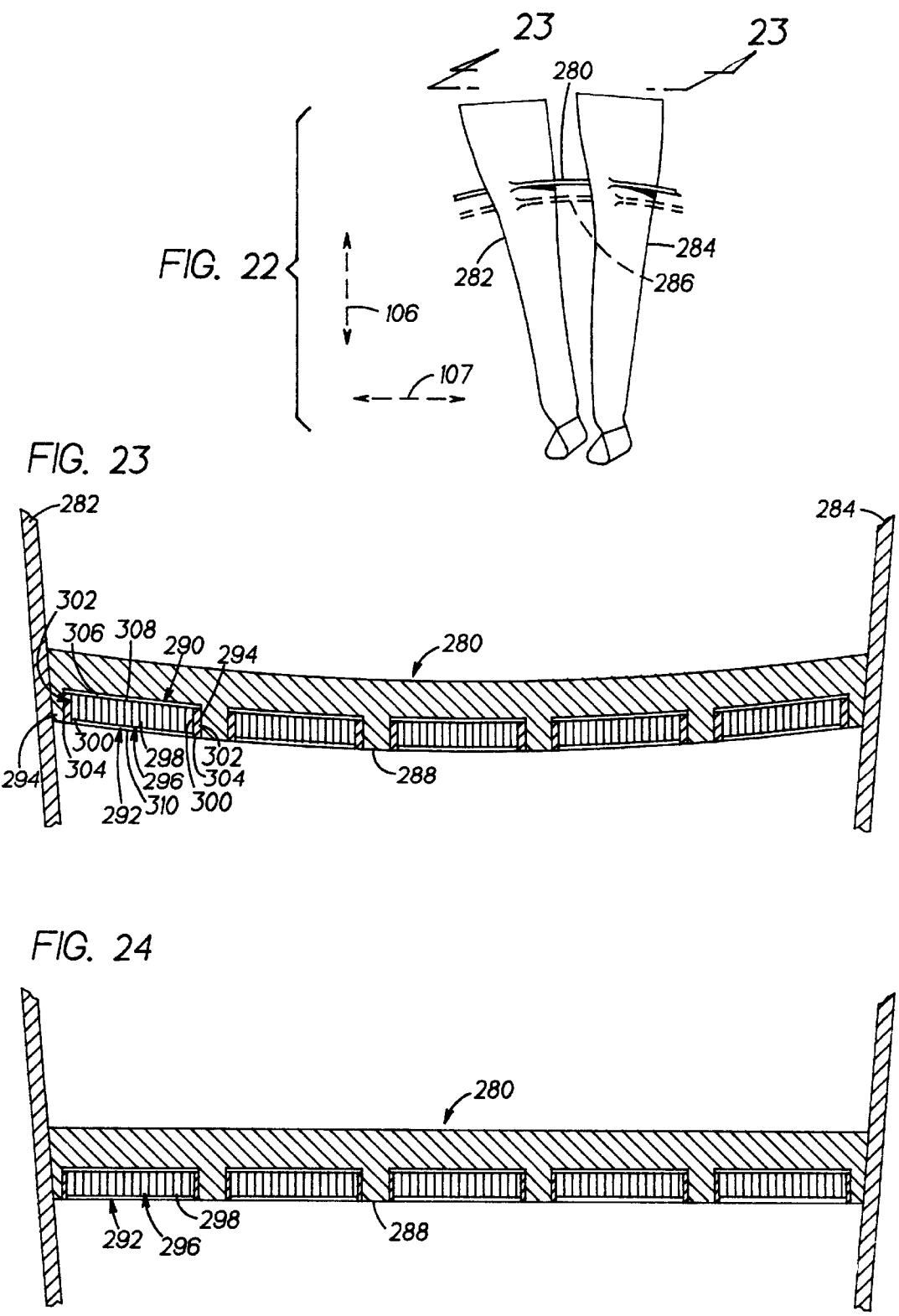

METHOD AND APPARATUS FOR DAMPING VIBRATION IN TURBOMACHINE COMPONENTS

This application is a continuation of application Ser. No. 08/998,446 filed on Dec. 26, 1997.

TECHNICAL FIELD

This invention relates to a method and apparatus for damping vibration in turbomachine components and more particularly to a method and apparatus that employs a mechanical-to-electromagnetic energy transformer for such damping.

BACKGROUND

Under operating conditions, a turbomachine component, for example, a gas turbine airfoil, is subjected to a variety of forces. Some forces are dependent on rotor speed, e.g. centrifugal force, resulting in a steady state or slowly varying strain (change in dimension, e.g., stretching or shortening) of the airfoil. Others result in a more dynamically varying strain, i.e., commonly referred to as vibratory strain, and airfoil vibration, e.g., forced vibration (resonance or buffeting) and aero elastic instability (flutter). The magnitudes of the forces and resulting strains depend on the engine operating conditions and the aircraft structural and aerodynamic properties.

To prevent damage to the airfoil, the magnitudes of the steady state and vibratory strains must not exceed the structural capabilities (limits) of the airfoil. In order to keep the vibratory strain of the airfoil within limits, the engine is often operated at lower than optimum conditions, resulting in a reduced engine operating efficiency.

Various approaches exist for reducing airfoil vibration. Some of these approaches involve stiffening the structure of the airfoil. The effect of stiffening is to adjust the resonant frequency of the airfoil to a value that is different from that of the vibratory force. Increased stiffness helps to prevent flutter-type vibratory strain. For example, a more rigidly constructed airfoil results in less vibration. However, a more rigid airfoil is often heavier (with associated disadvantages) and the optimum degree of rigidity is often not precisely known at the time that the airfoil is initially designed. Another approach makes use of a shroud, disposed at a midspan point on the airfoil. A midspan shroud has the effect of stiffening the airfoil. In addition, the shrouds interact with one another to reduce vibration of multiple adjacent blades. However, a midspan shroud tends to obstruct the airflow and thereby reduce turbomachine efficiency.

Passive vibration damping is another approach for reducing the magnitude of airfoil vibration. Passive vibration damping is a form of structural damping that involves the dissipation of energy. One approach for passive damping employs sliding friction devices, such as those employed under blade platforms. This approach relies on friction to dampen vibratory motion. However, most blade vibratory motion occurs above the platform, for which under-platform devices have limited effectiveness.

An active vibration control scheme has been proposed by Acton et al. in U.S. Pat. No. 4,967,550. The scheme uses a control system with actuators to counter blade vibration. Acton et al. disclose that two categories of actuators involving direct contact with the blades: "(i) electromagnetically actuated shakers attached to the blades for introducing forces in the blades, and (ii) piezoelectric or magnetostrictive means internal of the blades to deform them by changing the relevant characteristics of such, for examples embedded piezoelectric crystals which could distort the blade and thereby affect the local structural properties of the blades, e.g. by increasing the structural damping." Piezoelectric materials convert electrical energy to mechanical energy, and visa versa. Unlike passive methods, an active control system, sometimes referred to as a feedback system, is complex, requiring sensors, signal processing circuits, actuators, and a power supply. Embedding piezoelectric crystals in the blade requires a complex fabrication process. The combination of an active control system and embedded piezoelectric crystals is not practical in terms of cost and complexity.

SUMMARY OF THE INVENTION

An object of one aspect of the present invention is to provide a method and apparatus for passive damping of vibratory strain in a turbomachine component that experiences high steady state strain using mechanical-to-electromagnetic energy conversion without an active control system.

Another object of another aspect of the present invention is to provide a method and apparatus for airfoil vibration damping using mechanical-to-electromagnetic energy conversion without embedded actuators.

The present invention reduces the magnitude of vibratory strain in a turbomachine component that experiences high steady state strain by, in the case of a passive embodiment, coupling a mechanical-to-electromagnetic energy converter to an interior and/or exterior surface of the component, and/or embedding the energy converter within the component, and by, in the case of an active embodiment, coupling a mechanical-to-electromagnetic energy converter to an interior and/or exterior surface of the component. Thus, the present invention eliminates the need for an active embodiment with embedded piezoelectric crystals.

Damping as referred to herein is defined to mean reducing vibratory strain in a component, whether accomplished by dissipation or by stiffening.

Although passive vibration dampers that employ mechanical-to-electromagnetic energy conversion are known, until now, they have not been employed to dampen vibration of turbomachine components that experience high steady state stress. For example, with respect to rotating airfoils, the materials commonly used for passive damping, e.g., piezoelectric material, were not considered capable of providing sufficient damping, i.e., dissipation of energy, to be of practical value for passive damping vibration in. However, in accordance with the present invention, it has been determined that in regard to some types of turbomachine airfoil vibration, e.g., flutter, high frequency vibration modes, only a small amount of damping is needed. It has further been determined that passive vibration damping using mechanical-to-electrical energy conversion can often provide sufficient damping to be effective. In some embodiments, for example, such damping provides sufficient reduction in the magnitude of the strain on the airfoil that it enables the engine to be operated at closer to optimum conditions, and thereby achieve greater turbomachine efficiency.

Although systems that employ mechanical-to-electromagnetic energy conversion are known, until now, the mechanical-to-electrical energy converters in such systems have not been affixed to a surface of a turbomachine component that experiences high steady state stress. For example, with respect to a rotating airfoil, the mechanicalto-electromagnetic energy converters suggested for such systems have consisted of piezoelectric and magnetostrictive means internal of the blades, e.g., embedded piezoelectric crystals. There are many reasons for not affixing the mechanical-to-electrical energy converter to the surface of the blade. For example, a blade experiences very high steady state tensile strain during engine operation. Piezoelectric materials typically comprise a ceramic type of material and are thus susceptible to damage, i.e., cracking (breaking), or detaching (flying off) from the blade, in environments of such high steady state tensile strain. Furthermore, the magnitudes of the vibratory strains on an exterior surface of the blade is considered extreme for piezoelectrics. Another reason is to keep the mechanical-to-electrical energy converters out of the airflow, so as not to upset the aerodynamic shape of the blade. Embedded crystals may also have been considered necessary to achieve effective damping. However, it has been determined that the such materials may be suitably positioned on and attached to turbomachine airfoils to achieve effective damping without embedding it, in the form of crystals, within the structure of a blade. Moreover, it has been determined that because the vibratory stress is greater on the exterior of the blade, more effective vibration damping is often possible if the mechanical-to-electrical energy converters are coupled to an exterior surface of the blade, rather than embedded within the blade.

The present invention may be used to dampen any type (mode) of component vibration including but not limited flutter (aerolastic instability), resonance and buffet of airfoils. By reducing flutter for example, the airfoil can reliably operate at a higher pressure, thereby resulting in greater turbomachine efficiency.

BRIEF DESCRIPTION OF THE DRAWINGS

FIG. 7 is a stylized representation of the blade of FIG. 5B and a first embodiment of the damper of the present invention;

FIG. 21 is a cross section view of a portion of another embodiment of the blade of FIG. 5B and the energy transformer of FIG. 7;

FIG. 22 is a perspective view of a pair of adjacent fan blades mechanically coupled by a shroud, with which one or more embodiments of the damper of the present invention may be used;

FIG. 23 is a cross section view in the direction of 23—23 of a portion of the blades and the shroud of FIG. 22, and another embodiment of the energy transformer of FIG. 7, shown in a fan not operating state; and FIG. 24 is a cross section view of the blades, the shroud and the energy transformer of FIG. 23, shown in a fan operating state.

BEST MODE EMBODIMENT FOR CARRYING OUT THE INVENTION

The present invention is directed to the field of turbomachines, for use, or example, in solving the problem of vibration in turbomachine airfoils, e.g., a blade or a vane. To do this, the present invention makes use of a class of materials that convert mechanical energy to electromagnetic (i.e., electrical and/or magnetic) energy and visa versa. These materials are referred to herein as energy converting materials.

Figure 1:
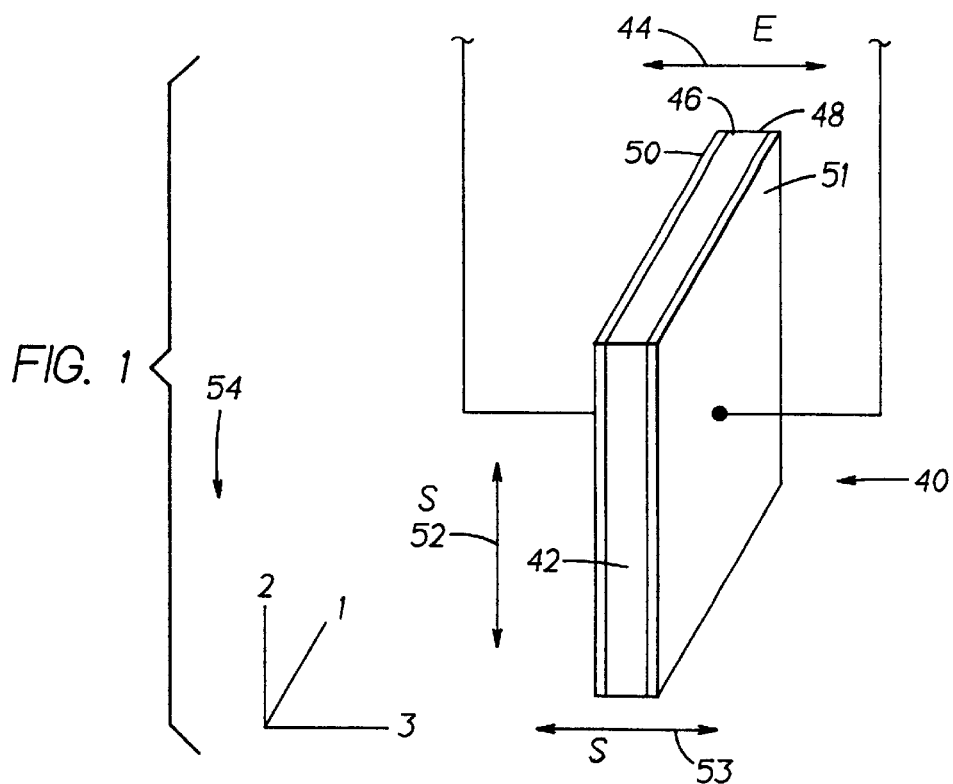
FIG. 1 is a perspective view of one type of piezoelectric component and electrical conductors that may be used in the present invention.

Some of the attributes of piezoelectric materials that are relevant to damping vibration in a turbomachine airfoil are explained with respect to a generalized piezoelectric component illustrated in FIG. 1. Referring now to FIG. 1, a component 40 comprises a block 42 of piezoelectric material. Piezoelectric materials can transform mechanical energy (in the nature of strain) to electrical energy (in the nature of electric charge) and visa versa. This characteristic is often referred to as the "piezoelectric effect". The block 42 has associated with it an electrical axis 44 and a pair of physically and electrically opposite sides 46, 48 at opposite ends of the axis 44. If the component 40 is appropriately strained (deformed), e.g., stretched or compressed, a charge differential is induced between the opposite sides 46, Similarly, if a charge differential is applied between the opposite sides 46, 48, mechanical strain is induced in the component 40. An electrically conductive electrode 50, 51 is disposed on each of the opposite sides 46, 48 to enable external electrical connection to the component 40.

It is customary to characterize the relative orientation between an applied strain and the electrical axis 44. This is because the magnitude of the charge differential (or strain) induced by the piezoelectric is related to the magnitude of the applied strain (or charge) by an electromechanical coupling coefficient k, which magnitude depends in turn on the relative orientation between the direction of the strain and the electrical axis 44. For example, an applied strain may be directed orthogonal 52 to that of the electrical axis (sometimes referred to as a transverse case), or, parallel 53 to that of the electrical axis (sometimes referred to as a longitudinal case). Shear cases and complex combinations of all the cases are also possible. The transverse and longitudinal cases can be alternatively characterized as $d_{31}$ and $d_{33}$ respectively, relative to an arbitrary rectangular coordinate system 54 having axes, 1, 2, and 3. The first digit of each subscript refers to the direction of the electrical axis 44 relative to the coordinate system. (It is conventional to orient the component such that the electrical axis is aligned with the 3 axis direction). The second digit refers to the direction 52, 53 of the applied strain relative to the coordinate system. The magnitude of the coupling coefficient for the longitudinal case ($d_{33}$, strain direction 53) is generally greater than that of the transverse case ($d_{31}$, strain direction 52).

Figure 2:
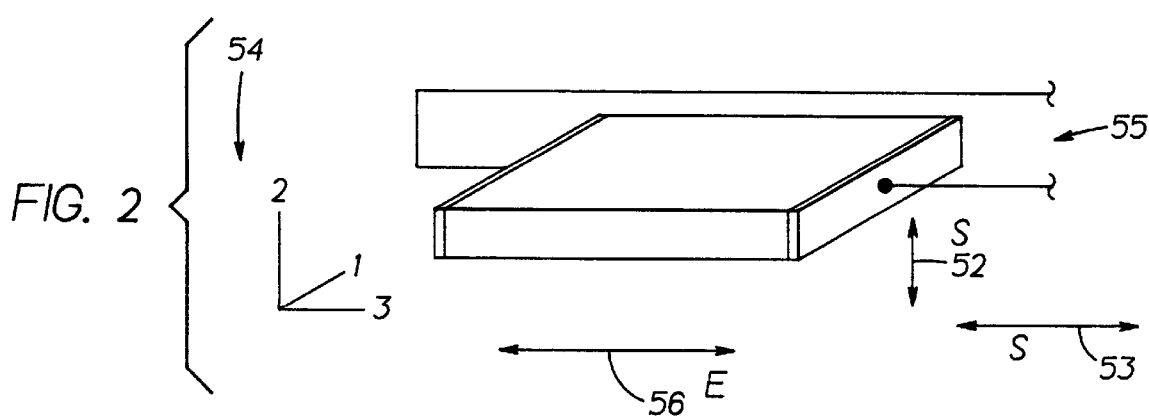
FIG. 2 is a perspective view of another type of piezoelectric component and electrical conductors that may be used in the present invention.

The orientation of the electrical axis of a particular piezoelectric component is typically initially established in part as a result of a process called polling. Traditionally, polling involves a one time application of a select voltage differential between the to be electrically opposite sides. Relative to each other, one of the sides is charged positive and the other is charged negative. This alters the piezoelectric at its crystalline level (reorienting domains) and thereby establishes the electrical axis. FIG. 2 illustrates a component 55 having a similar shape but different electrical axis 56 orientation, i.e. different polling, than that of the component 40 of FIG. 1. As with the component 40 of FIG. 1, a strain applied to component 55 may be directed orthogonal 52 (transverse case) or, parallel 53 (longitudinal case) to that of its electrical axis 56.

The polling process also causes changes to the physical dimensions of the piezoelectric component. For example, upon polling the component of FIG. 1, the component expands in the direction of the electrical axis and shrinks in all other directions. Some of the embodiments of the present invention make beneficial use of this phenomenon as described hereinbelow.

Figure 3:
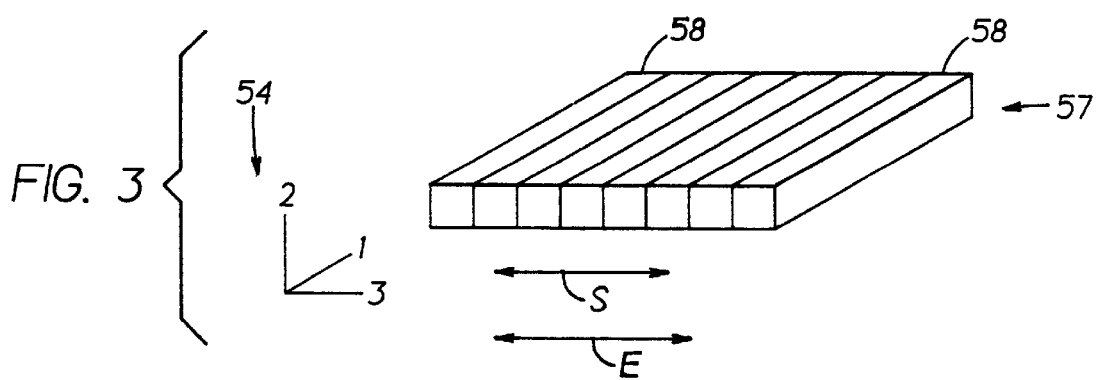
FIG. 3 is a stack of piezoelectric components of the type in FIG. 2.
Figure 4:
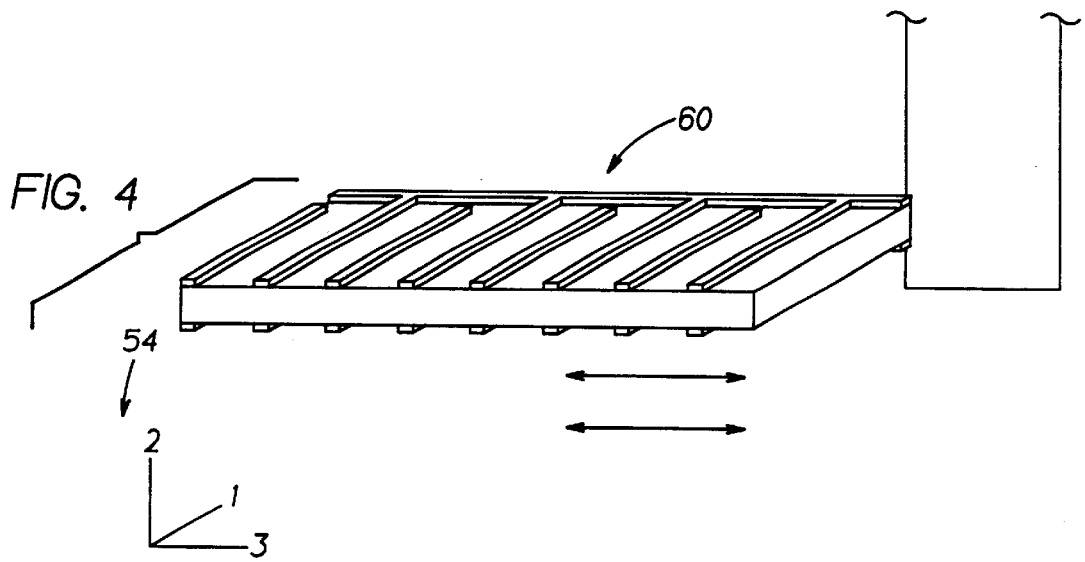
FIG. 4 is a perspective view of another type of piezoelectric component and electrical conductors that may be used in the present invention.

It is important to note that the parallel (longitudinal case, $d_{33}$) orientation is traditionally implemented as a stack 57 of electrically interconnected components 58 (see FIG. 3) rather than as a single component (as in FIGS. 1, 2). The stack is appropriately compressed, end to end, to keep the elements from separating from each other. This has traditionally been accomplished by positioning and tightening an adjustable clamp around the stack. The $d_{33}$ orientation has traditionally been used for actuation (e.g., for deforming small mirrors and in clam shell type speakers) and not for vibration damping. A component 60 having a different (but less efficient) type of $d_{33}$ orientation is described in U.S. Pat. No. 4,491,761 and illustrated in FIG. 4.

Figure 5A:
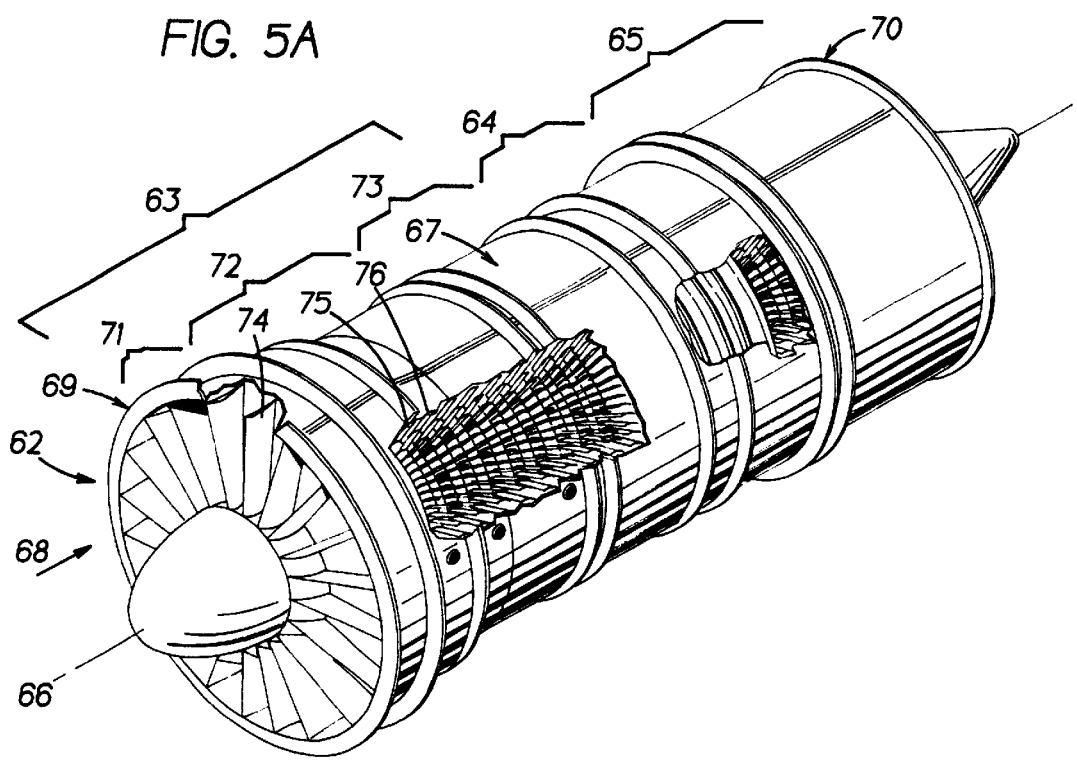
FIG. 5A is a perspective view partially broke away of a gas turbine engine with which the present invention may be used.

The damper of the present invention is disclosed with respect to embodiments for use with a fan blade of the type used in a gas turbine engine illustrated in FIG. 5A. Referring now to FIG. 5A, a conventional gas turbine engine 62 includes compressor 63, combustor 64, and turbine 65 sections disposed along a longitudinal axis 66 and enclosed in an engine case 67. Gas, i.e., air, 68 flows longitudinally through the engine 62, entering at an upstream end 69 of the compressor section 63 and exiting at a downstream end 70 of the turbine section 65.

The compressor includes a fan 71, a low pressure compressor 72, and a high pressure compressor 73. The fan 71 includes a plurality of rotating airfoils 74, or blades. The low and high compressors 72, 73 each include alternating stages of rotating blades 75, and stationary airfoils 76, or vanes.

Figure 5B:
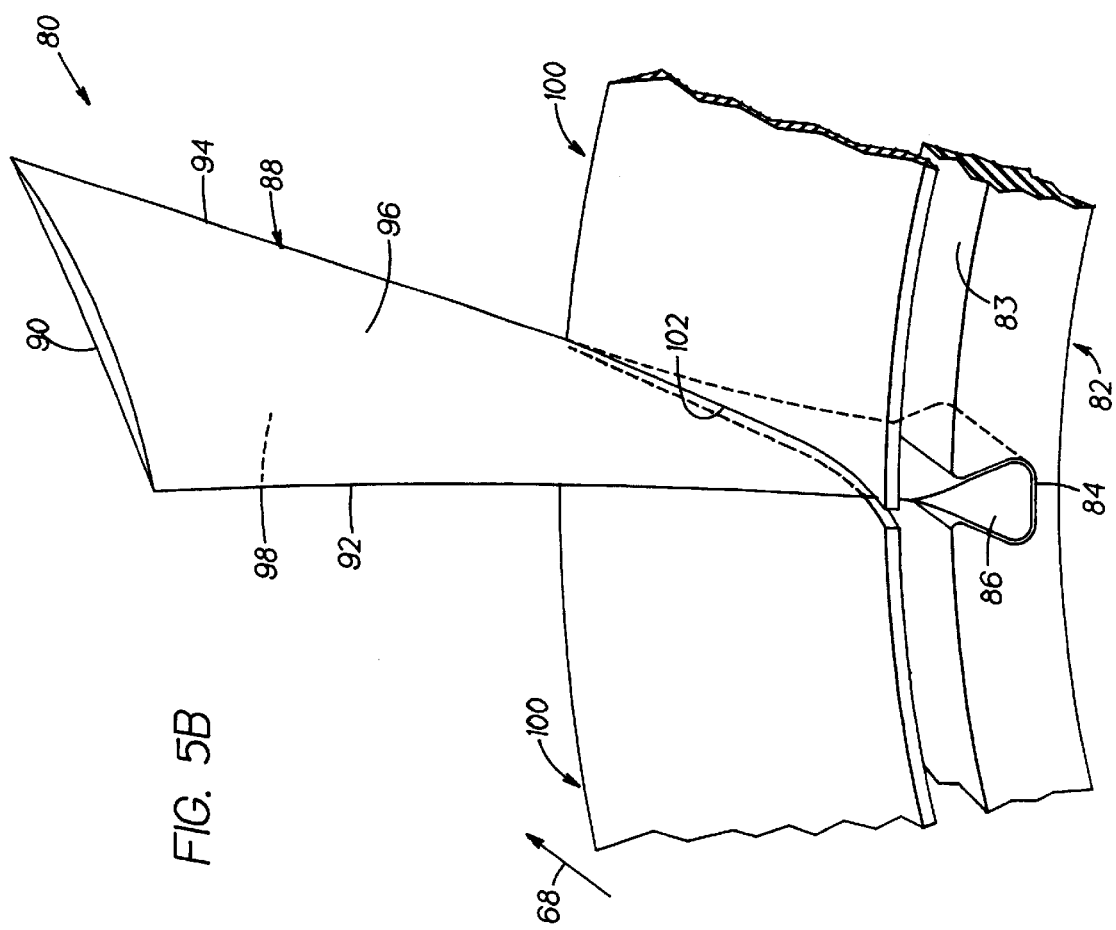
FIG. 5B is a perspective view of a portion of a fan section having a fan blade with which one or more embodiments of the damper of the present invention may be used.

Referring now to FIG. 5B, a portion 80 of a fan section comprises a fan disk 82 having a circumferentially outer surface 83 with a slot 84 that receives a root 86 of a fan blade 88. The fan blade 88 further comprises an airfoil 90 having a leading edge 92, a trailing edge 94, a suction side 96, and a pressure side 98. The airfoil is positioned between circumferentially spaced platforms 100, wherein one portion of the airfoil is situated radially outward of the platforms 100 and the other is radially inward of the platforms 100. The radially outward portion is in the path of and receives kinetic energy from the axially directed gas flow 68. The radially inward portion is not in the gas flow 68 path. Dotted line 102 demarcates the portion of the airfoil that is in the gas flow 68 path from the portion that is not.

Figure 6A:
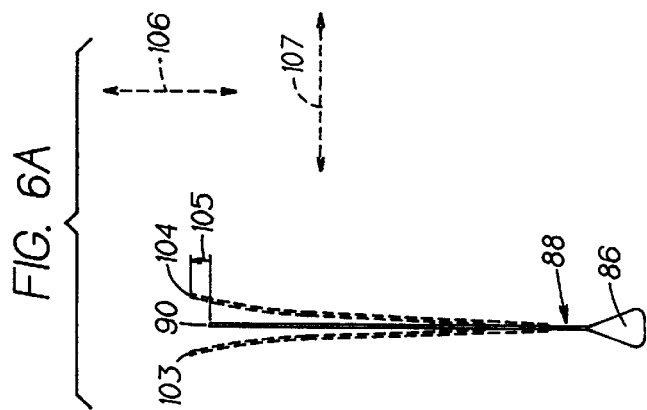
FIG. 6A is a side view representation of one possible mode of vibration for the blade of FIG. 5B.
Figure 6C:
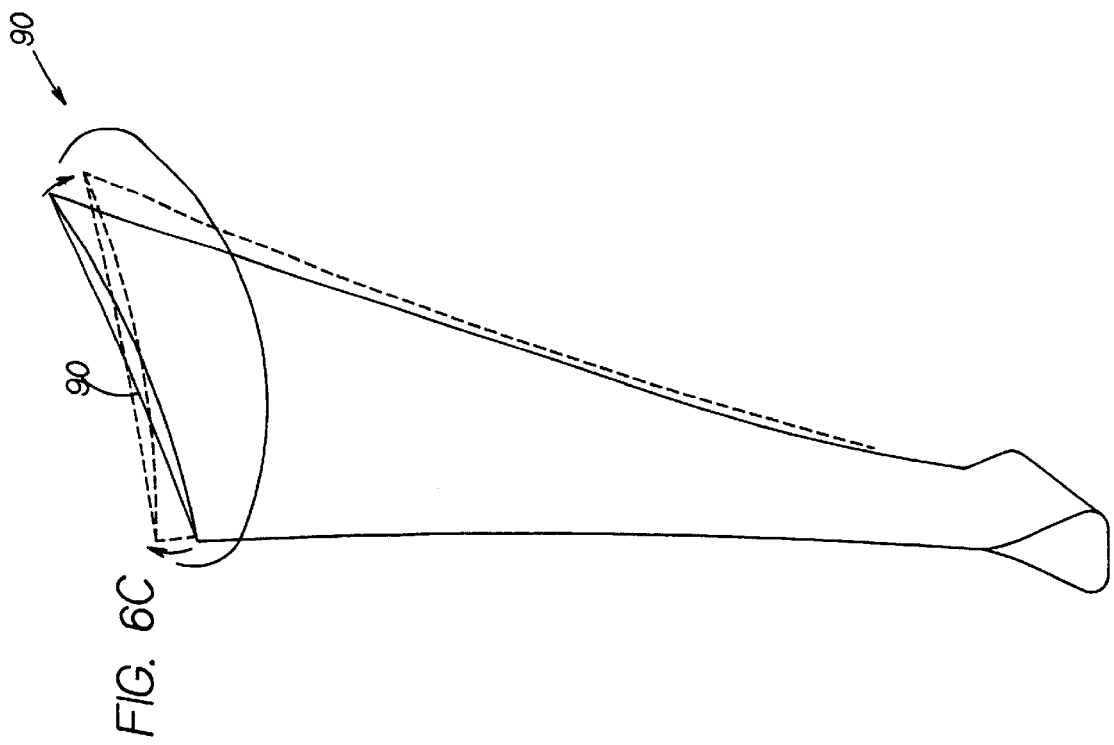
FIG. 6C is a perspective view of an airfoil twisting.
Figure 6B:
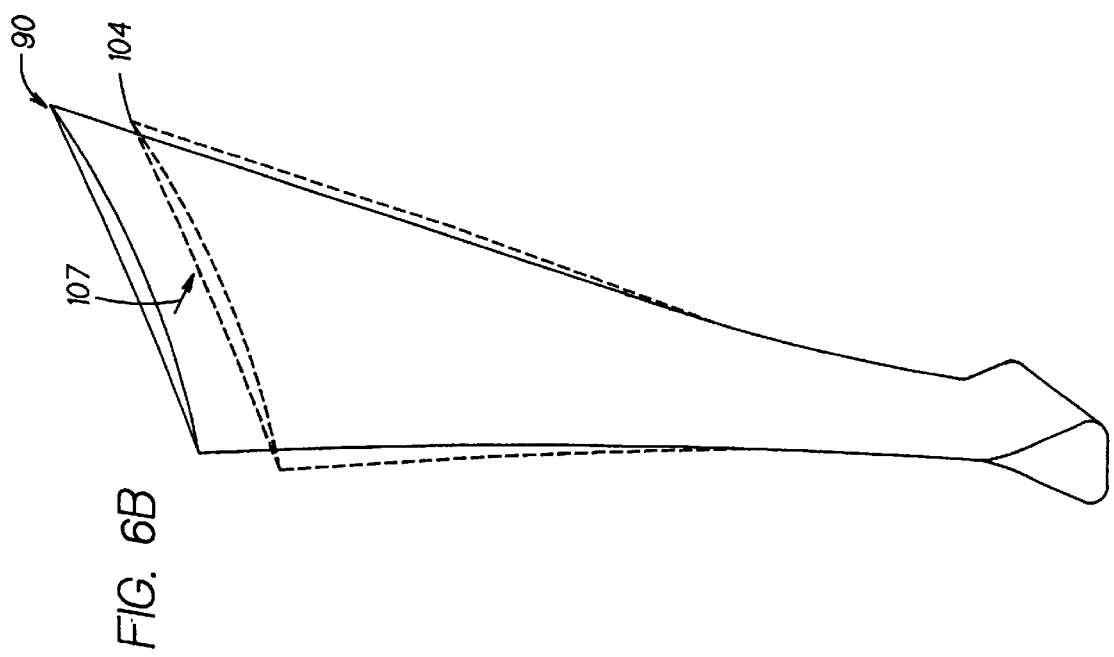
FIG. 6B is a perspective view of an airfoil bending.

Referring now to FIG. 6A, the blade 88 experiences steady state and vibratory forces during engine operation. A pair of dotted outlines 103, 104 represent a simplified illustration of some likely effects of these forces. First, the steady state forces cause the blade to strain and stretch 105 in a radial direction 106. Second, the vibratory forces may cause the blade to bend and vibrate back and forth in a circumferential-like direction 107. FIG. 6B provides a perspective view of the bending. The result of this vibration is an alternating stretching and compressing of the surfaces on the sides of the blade. From the perspective of the surfaces, this is similar to a vibratory strain in the radial direction 106. The vibratory mode described here is typical of a flutter mode of vibration, although other vibratory modes are possible. The blade may also experience twisting (torsional) strains similar to that illustrated in FIG. 6C. The magnitude of the strains generally vary from location to location across the blade. Undamped, the vibratory strains can become large and exceed that of the steady state strain.

Referring now to FIG. 7, a damper 108 comprises an energy transformer 110 affixed to the blade 88, and an electrical circuit 112. The energy transformer is preferably located on a region of the blade where the magnitude of the vibratory strain is significant yet the steady state and vibratory strain is not so large as to cause damage to the energy transformer. Here, the energy transformer is affixed to a region on the pressure side, above the root but out of the gas path. It has been determined that this region has significant steady state and vibratory strain in the radial direction 106. The strain in an axial direction 114 is relatively low. However, depending on the magnitude and mode (e.g., bend v. twist, relative strains on each side of the blade) of the blade vibration in the particular embodiment, it may be desirable to alternatively locate the energy transformer on the suction side or to locate energy transformers on the suction and pressure sides of the blade. Note that the pressure side 98 generally encounters less debris than the suction side.

The energy transformer 110 includes one or more converter components 116 each comprising an energy converting material, preferably a PZT (lead zirconate titanate) or composite of PZT type of piezoelectric ceramic material. The converters 116 may be substantially block-like in shape. In one embodiment, the converters have a shape with dimensions on the order of about 2 inches long (radial direction), 2 inches wide (axial direction), and 0.1 to 0.2 inches thick (FIG. 8) (circumferential direction), however the optimal shape (and quantity) of the converters will vary depending on size, shape and stresses of the blade. It is generally desirable for the converter components to have a size that enables them to conform to the contour of the blade. In the embodiment mentioned above, the blade has dimensions of about 40 inches long, and 18 inches wide. The converter components 116 may be located within a retainer 118 having a substantially frame-like shape that physically contacts the sides of the converter components 116. The retainer 118 preferably comprises a polymer type of material.

In this embodiment, the converter components 116 are oriented such that the direction of their electrical axis is substantially parallel to the circumferential direction. This represents a $d_{31}$ (orthogonal, transverse case) orientation relative to both the radially directed vibratory strain and the principal axis of steady state mechanical strain (the principal blade stretching direction).

The converters 116 may be electrically interconnected to each other via conductors 120 within the energy transformer 110. If so, the use of multiple redundant copper conductors 120 or a ductile conductive sheet is recommended for greater durability. Because the converter components are typically stiffer than the retainer 118, conductor 120 spans 121 between the converter components 116 and the retainer 118 are preferably oriented in a direction of low strain (e.g. the axial direction) in order to avoid damage to the conductors 120 when the energy transformer 110 is mechanically strained.

The converter components 116 are electrically connected via conductors 122a, 122b to the electrical circuit 112, which may be located either in proximity to or remote from the energy transformer 110. As the blade 88 experiences vibratory strain, mechanical energy is coupled into the energy transformer 110 and transmitted to the converter components 116. The converter components 116 convert the mechanical energy to electrical energy that may be dissipated in the electrical circuit 112, further described hereinbelow.

Figure 8:
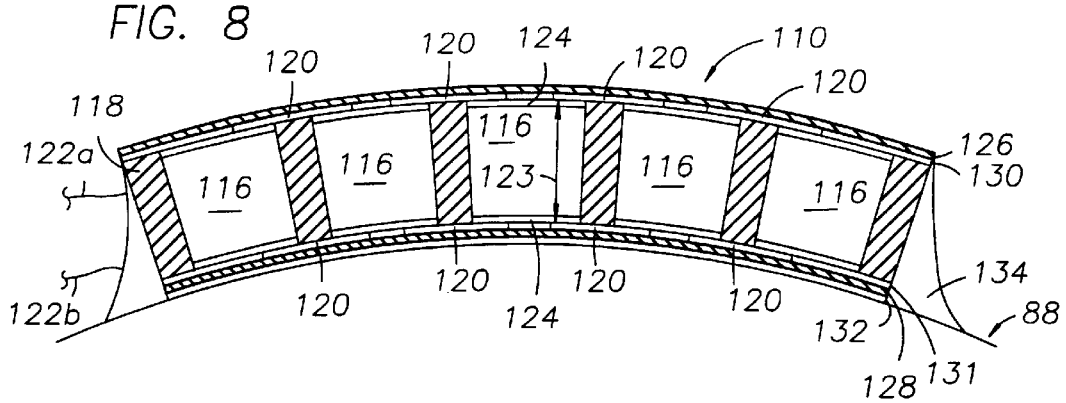
FIG. 8 is a cross section view in the direction of 8—8 portion of the blade and an energy transformer of the damper of FIG. 7.

Referring now to FIG. 8, as mentioned above, in one embodiment, the converter components 116 have a thickness 123 with a magnitude preferably on the order of from about 0.1 to 0.2 inches. Electrically conductive electrodes 124 (e.g., metalized surfaces) are disposed on opposite sides of the converter components 116 thereby enabling electrical connection to the components 116. The converters 116 are typically polled prior to assembly of the energy transformer, such that one of the electrodes 124 on each converter component 116 is positively polled and the other of the electrodes 124 is negatively polled. The conductors 120 interconnect the like-polled electrodes of the converter components 116 and preferably comprise conductive strips affixed to inner and outer polymer layers 126, 128 (as in conductive strips on a printed circuit board). The conductors 120 may alternatively comprise a continuous electrical screen that may be affixed to the polymer layers. The polymer layers 126, 128 preferably comprise an insulating material, such as for example, kapton, to electrically insulate the energy transformer from the blade 88. The polymer layers 126, 128 also provide sealing to protect the converter components 116 from the environment outside the energy transformer 110. The energy transformer is preferably joined together into a single unit. This may be achieved by adhesive 130, 131 between the polymer layers 126, 128 and the converter components 116. The energy transformer could alternatively be joined together by placing all of the elements in proper positional relationship within a mold and pressure injecting a polymer or adhesive material thereinto. As a further alternative, the polymer layers may comprise a material that could be formed and cured to hold the energy transformer together.

The energy transformer 110 is preferably affixed to the blade 88 in such a way as to maximize mechanical strain energy transfer to the converter component 116. This typically involves the use of a layer 132 of adhesive, e.g., an epoxy, that can transmit mechanical strain energy. A thin membrane of adhesive that can be cut as a sheet and made to conform to the blade is recommended. A preferred process for bonding the energy transformer to the blade comprises placing the adhesive layer on the blade, placing the energy transformer superjacent the adhesive layer, and applying suitable pressure and temperature, e.g., in an autoclave, to obtain the desired bond. Any other suitable process including those involving clamps may also be used.

In this embodiment, in order to maximize strain energy transfer, the distance between the converter components 116 and the fan blade is as small as possible. Thus, the layers situated between the converter components 116 and blade 88 are no thicker than necessary. In addition, the energy transformer 110 preferably conforms to the blade 88 to the maximum extent practical. A gap of even a few mils can significantly impede effective strain transfer. To achieve conformity, each of the converter components may be ground to match the local curvature of the of the blade. Alternatively, the blade surface may be formed having or machined to have one or more generally flat surface regions suitable for locating the energy transformer.

However, in some embodiments, a small gap between the converter components and the blade is desirable. Whether a gap is advantageous or not depends on the thickness of the blade and the thickness of the converter component. If the converter component is too thick it does not make a good damper and a gap makes it even worse. A thin converter component can sometimes be more effective if a gap is provided. The gap is preferably filled with a material that facilitates an increase in the effectiveness of the converter component, i.e. if the gap is filled with something as stiff as the blade then there may be no increase in effectiveness of the converter component.

A fillet 134 is preferably formed along the edges of the energy transformer to prevent the edges from delaminating during engine operation due to tensile stress. The fillet may comprise an adhesive or any other suitable material. The radius and gradual transition provided by the fillet reduces the concentration of stress at the edges of the energy transformer. If a larger fillet is desired, the fillet may be supplemented with a suitable material such as silicone rubber, e.g., RTV. The fillet may have passages for the electrical conductors 122a, 122b to pass through. Although not shown, the edges of the energy transformer 110 itself may be contoured to alleviate stress concentrations on its corners. A concave contour is generally best, but any other suitable contour, e.g. convex, linear, etc., may also be used.

The size and weight of the energy transformer will typically depend on the desired amount of vibration damping and the efficiency of the damper. This in turn depends on the overall system objectives and parameters, including for example, the characteristics of the blade. It also depends on the location of the energy transformer on the blade. Generally speaking, a small amount of damping can provide a large improvement in the flutter boundary. For example, sufficient damping may be provided by a energy transformer weighing only 2 or 3 percent that of the blade. To make efficient usage of the converter components, it is generally desirable to have a large percentage of their volume located where the magnitude of the strain is highest. However, if the converter components are too thick and/or rigid, effective transfer of mechanical strain from the blade to the components may be impeded.

Figure 9:
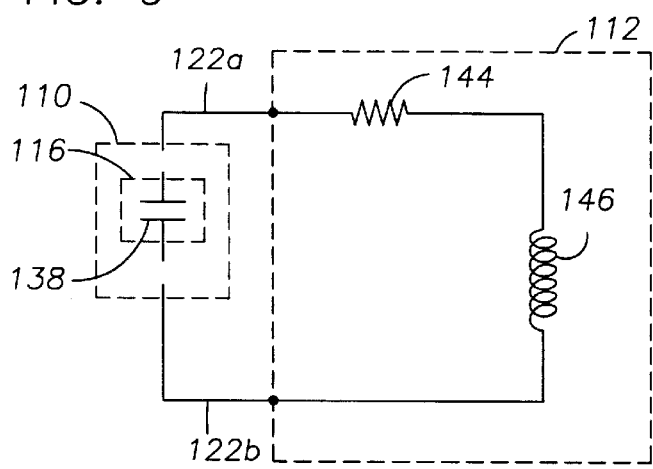
FIG. 9 is a schematic representation of the electrical components and interconnection of the damper of FIG. 7.

Referring now to FIG. 9, from an electrical perspective, each of the converter components 116 within the energy transformer 110 resemble a capacitor 138 wherein electrical energy induced in the converter component by vibration can be represented as a charge differential across the capacitor 138. The electrical circuit 112 connected to the energy transformer 110 may comprise a resistive component 144, or any other suitable element, to dissipate the induced electrical energy. Such an approach provides damping for a broad range of blade vibratory frequencies.

In embodiments using PZT converter components the electrical circuit 112 may further comprise an inductive component to create, in combination with the capacitance 138 of the converter component 116, a resonant circuit. A resonant circuit is a tuned bandpass filter. In such an embodiment, the energy transformer exhibits a frequency dependent damping and stiffness. The frequency dependency depends on the values of the components in the circuit. Further, with a resonant circuit arrangement, all of the electrical energy is not dissipated in the resistive component 144. Instead, some of the electrical energy is returned to the converter component, out of phase relative to the vibratory strain of the blade. The returned energy induces a strain in the converter component that opposes the vibratory strain of the blade. This result is a variation in the stiffness of the energy transformer throughout a particular range band) of frequencies, and a decrease in vibratory stress throughout the range.

One situation for which a resonant circuit is useful is as follows. High vibratory stresses may occur in a fan or other structure if the frequency of a periodic force matches a natural or fundamental frequency of the structure. This is called forced harmonic vibration. The magnitude of the stress at resonance is determined by the magnitude of the forcing function and the mass, stiffness and structural damping of the structure. If the frequency of the forcing function is constant, stress reduction can be achieved by increased damping or by changing the natural frequency of the structure, i.e., changing the mass or stiffness or both.

By using a resonant circuit, damping can be tuned (optimized from frequency and magnitude perspectives), for a particular application. Thus, the desired damping may be achieved with fewer, smaller, and/or lighter converter components compared to that without a resonant circuit. A dimensionless quantity Q is often used to describe a resonant circuit's characteristics. Q is defined as: Q=(resonant frequency)/bandwidth. A larger Q value results in a larger proportion of the electrical energy being converted by the converter component back to mechanical strain. It should be understood that a resonant circuit may be provided by circuit topologies other than that employed in this embodiment.

In selecting an inductor 146, it is important to recognize that the permeability of iron depends on the mechanical stress environment. Thus, an inductive component may have one inductance magnitude at one rotor speed and a different inductance magnitude at another rotor speed. Therefore, the inductor 146 should be designed such that it has the desired inductance at the expected mechanical stress level. Note that an inductor experiences less mechanical stress if located on the disk than if located on the blade. A wound torroid may provide the most stable magnitude inductor, but it may not provide the most efficient use of mass. If a gapped E frame is used, care should be taken to keep the gap distance constant. A non ferromagnetic such as a kapton wedge may be used to accomplish this.

An active circuit may be used in place of a fixed magnitude inductive component 146. Such circuit may provide one or more signals to emulate those of the inductor 146 in the resonant circuit. The active circuit could be powered by converted electrical energy that would otherwise be dissipated in the resistive component. The circuit may comprise an op amp or more preferably high efficiency discrete transistors. Such a circuit may weigh less than an iron core inductor. The circuit may also be self tuning. That is, it may change its inductance magnitude to suits the application. In doing so, the circuit may sense the frequency of the converted electrical energy. One advantage of self tuning is that damping characteristics may be tuned to the magnitude and frequency vibration prevailing at any given moment. This is important in part because the magnitude and frequency of the blade vibration depends on the blade rotation speed, and different rotation speeds may be employed during engine operation.

The electric circuit may be located near the energy transformer, e.g. on the blade, in order to minimize the length of the interconnecting conductors. If the circuit is too large to locate on the blade, then it may be located on or near the disk, e.g. on the circumferentially outer surface 83 of the disk. It may be desirable to select a energy transformer that provides the highest possible capacitance in order to keep the magnitude of the inductor low. This involves choices detailed hereinbelow.

It should be understood that depending on the application, more than one electrical circuit may be desired. For example, in the best mode embodiment, a single electric circuit is used to damp one or two modes of vibration. However, if more modes, e.g., ten modes, required damping, then additional dissipative circuits may be appropriate.

Figure 10:
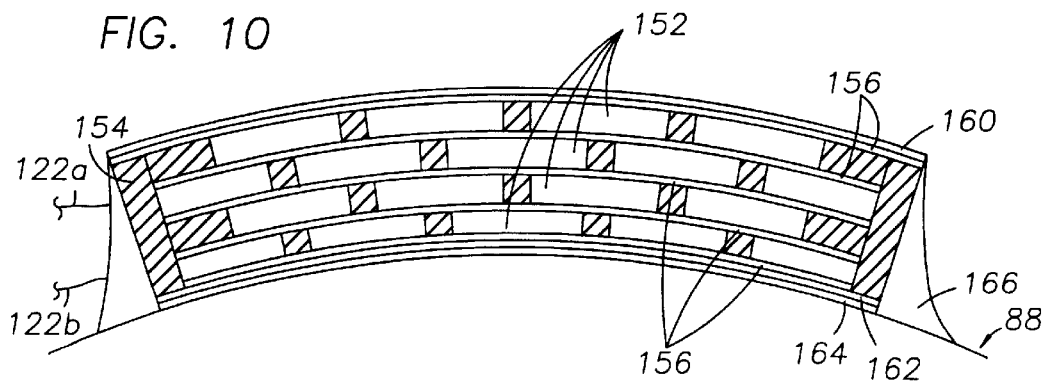
FIG. 10 is a cross section view of 8—8 of a portion of the blade of FIG. 7 and another embodiment of the energy transformer of FIG. 7.

Referring now to FIG. 10, an alternate embodiment for an energy transformer 150 comprises converter components 152 which function substantially the same as but are not as thick as the converter components 116 in the energy transformer 110 of the first embodiment. These components 152 preferably have a shape that is sheet-like, defined herein as having a length dimension (radial direction) and width dimension (axial direction) substantially greater than a thickness dimension (circumferential direction). In one embodiment, the dimensions of the components are on the order of about 2 inches long (radial direction), 2 inches wide (axial direction), and 0.02 inches thick (circumferential direction), however, the optimal shape (and quantity) of the converters will vary depending on size, shape and stresses of the blade. The converter components 152 are arranged in one or more "layers" in a retainer 154 such as, for example, a preform comprised of a polymer or suitable alternate type of material.

Figure 11:
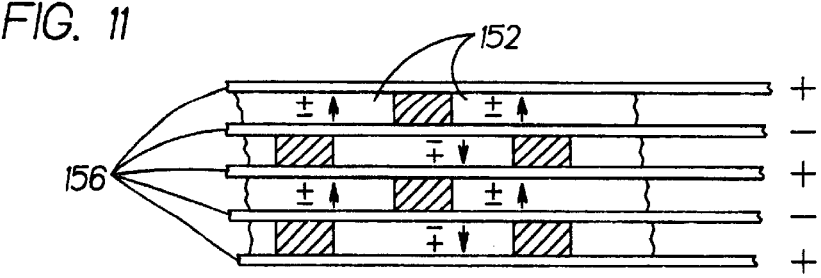
FIG. 11 is a cross section view of a portion of the energy transformer of FIG. 10.
Figure 12:
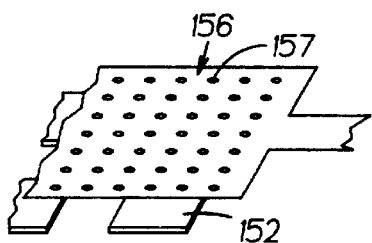
FIG. 12 is a perspective view of a ductile conductor that may be used in the energy transformer of FIG. 10.
Figure 13:
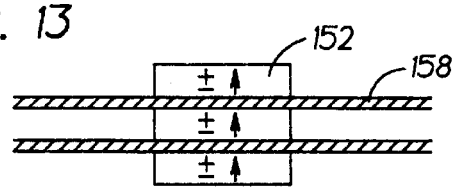
FIG. 13 is a cross section view of a portion of another embodiment of the energy transformer of FIG. 7.

Referring now to FIG. 11, adjacent converter component 152 layers may be oriented such that their polled directions are oppositely directed (180 degree difference) from one another, i.e. positively polled electrodes in one layer face positively polled electrodes in an adjacent layer, negatively polled electrodes in one layer face negatively polled electrodes in an adjacent layer. This component 152 orientation makes electrical interconnection of like polled electrodes easier. For example, a continuous ductile electrical conductor 156 such as that shown in FIG. 12 may be used to interconnect like polled terminals situated within adjacent layers. Holes 157 may be incorporated into the ductile conductor to improve bonding between the layers of converter components 152. The converter components 152 may alternatively be oriented with their poling directions aligned with each other, as shown in FIG. 13. However, such orientation requires an electrical insulator layer 158 between the layers of converter components 152 to prevent electrical connection between dissimilarly polled electrodes.

Referring again to FIG. 10, the energy transformer 150 further comprises polymer layers 160, 162 which are substantially similar to corresponding polymer layers 126, 128 (FIG. 8) in the energy transformer 110. The transformer may further comprise an adhesive layer 164 and fillets 166 which are substantially the same as corresponding adhesive layer 132 (FIG. 8) and fillets 134 (FIG. 8) in the energy transformer 110. The edges of the energy transformer 150 may be contoured to alleviate stress concentrations on its corners. As with the energy transformer 110 (FIG. 8) of the first embodiment, the energy transformer 150 is preferably joined together into a single unit. Adhesive layers (not shown) are typically employed between layers of converter components 152 for this purpose. The size and weight of the energy transformer will typically depend on the desired amount of vibration damping.

In a preferred process for affixing the energy transformer 150 to the blade, the converter components 152 are first arranged in layers in the retainer 154. The retainer 154 preferably comprises either a thermal set or chemically activated polymer material and is initially in a flexible form. Pressure is applied either by a mold of identical shape as that of the relevant portion of the fan blade or by gas pressure across a bladder as is done in autoclave processing. The application of pressure causes the retainer 154 to conform to the shape of the fan blade. During this process, each individual converter component 152 may bend slightly to better conform to the fan blade 88. The retainer 154 hardens to its final shape. An adhesive layer 164 between the pack and the blade 88 is added if necessary. Alternatively, the retainer may be shaped without the blade, e.g., using process above with the process above, and later affixed to the blade.

This embodiment has several advantages compared to the first embodiment. The converter components 152 elements are thinner and as obtained commercially, often of higher quality, i.e., smaller size and fewer flaws per cubic inch, than the components 116 (FIG. 8) in the first embodiment. This results in greater strength per square inch. These converter components 152 are also more flexible than those in the first embodiment, and therefore are more easily conformed to the shape of the blade. Thus, individual grinding of the components is not essential, nor must the blade have flat spots. Furthermore, the thinner converter components 152 may couple mechanical strain more efficiently than the thicker converter components 116 and may be more tolerant of high steady state strains. However, this embodiment may result in a lower overall strain transfer coefficient for the energy transformer 150 than that of the energy transformer 110 (FIG. 8) because of the additional glue layers between the layers of converter components 152. Such layers potentially hinder the transfer of mechanical strain from the blade to the converter components 152. As in the first embodiment, care should be taken when selecting and orienting materials. Although shown staggered, the converter components 152 may alternatively be oriented in substantial registration with each other.

The energy transformer 150 may be configured to provide any of various different capacitance magnitudes by alternatively interconnecting the converter components 152 in parallel, series, or a combination thereof. It should be understood that for a given volume, an energy transformer with 0.01 inch thick converter components can provide a factor of 100 greater capacitance than that provided by an energy transformer with 0.1 inch thick components. (This is because the thinner components provide ten times closer spacing of the component electrodes, and also enable ten times as many converter components to be packed within a given volume, potentially resulting in a ten times as much cumulative electrode surface area.) A greater capacitance magnitude permits a smaller magnitude inductor 146 (FIG. 9) with obvious weight and placement advantages.

The operation of a damper having an energy transformer similar to the energy transformer 150 has been demonstrated on a 17 inch fan blade for preventing flutter. The parameters of the damper were as follows:

| | |
|---|---|
| blade weight: | 0.305 pounds |
| converter component (piezoelectric) weight: | 0.0198 pounds |
| piezoelectric capacitance | 165 nanofarads |
| blade flutter frequency | 292 hertz |
| resistor without inductor | 3000 ohms |
| resistor with inductor | 500 ohms |
| inductor | 1.7 henries |

Figure 14:
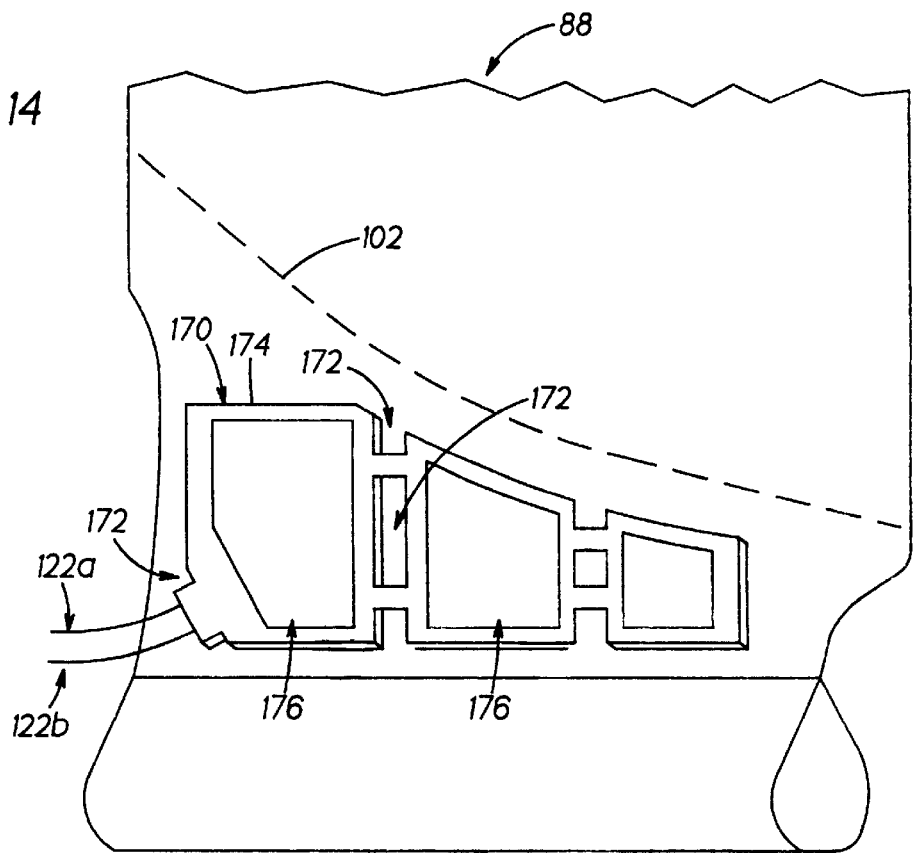
FIG. 14 is a perspective view of the blade of FIG. 5B and another embodiment of the energy transformer of FIG. 7.

Referring now to FIG. 14, in another embodiment, an energy transformer 170 may be substantially similar to the energy transformers 110 (FIG. 8), 150 (FIG. 10) described above, but may be provided with slots 172 in the retainer 174. Such slots 172 afford the energy transformer 170 with greater flexibility thereby facilitating greater conformance to the blade 88. Although shown with converter components 176 that are larger than converter components 116 (FIG. 8), 152 (FIG. 10), larger converter components are not required.

As mentioned above, the magnitude of the steady state strain should be considered when selecting a design and location for the energy transformer. Excessively high $d_{31}$ directed steady state strains can degrade the electromechanical coupling coefficient of piezoelectric material. Such strains can also crack the piezoelectric components. Note that commercial piezoelectric material typically cracks at 1,000 to 1,500 ppm strain (after polling). Higher quality piezoelectric typically withstands strain magnitudes as high as to 2,000 ppm. However, the region of a titanium blade located in the vicinity of the root may stretch 3,000 to 4,000 ppm steady state. The steady state strain may thus be roughly 2.5 times the tensile strength of PZT ceramic piezoelectrics (note that titanium typically withstands 50 thousand pounds per square inch (kpsi), while PZT piezoelectric material typically withstands 20 kpsi).

Varied approaches may be employed where necessary to prevent piezoelectric components from cracking due to excessively high steady state strain. For example, more titanium material could be added to the blade to reduce the steady state strain. However, this has obvious weight disadvantages. Alternatively, the piezoelectric components may be maintained under compressive forces that counter the steady state stretching forces. One process for achieving this uses a force to strain the blade in the same direction as that of the expected steady state strain. The piezoelectric components are then affixed to the blade. Afterward, the force is removed and the blade is allowed to return to its original shape, resulting in a compressive force on the energy transformer 170 and converter components 176. The magnitude of the compressive strain is preferably large enough that the combination of the compressive strain and the steady state strain does not exceed the capability of the piezoelectric components.

Another approach is to employ a gap, mentioned above with respect to FIG. 8, between the converter components and the blade. Filling the gap with a material that is less stiff than the blade may result in less steady state strain being transmitted to the converter components yet still provide suitable transmission of vibratory strain.

Figure 15:
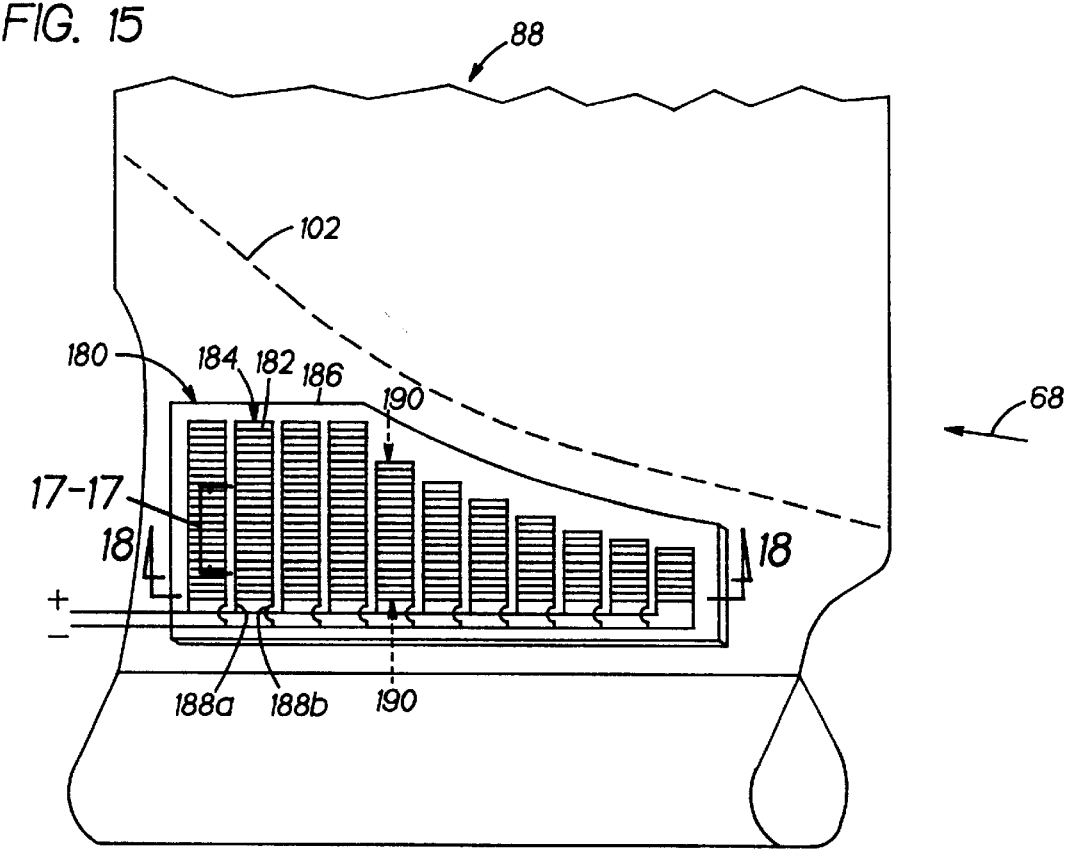
FIG. 15 is a perspective view of the blade of FIG. 5B and another embodiment of the energy transformer of FIG. 7.

Referring now to FIG. 15, in another embodiment of damper of the present invention, an energy transformer 180 comprises a plurality of converter components 182. The converter components 182 preferably have a block-like shape, but are smaller and thinner (enabling a higher capacitance magnitude as explained above with respect to energy transformer 150 (FIG. 10)). The components 182 are preferably arranged into one or more stacks 184 that may be somewhat similar to the stack 57 of FIG. 3. The stacks 184 may be located within a retainer 186. Components 182 within a stack are typically electrically connected to each other. Such connection may be provided in part by conductors 188a, 188b.

The stacks 184 are preferably oriented such that the direction of the electrical axis of the converter components 182 is substantially parallel to the radial direction. This represents a $d_{33}$ orientation relative to both the radially directed vibratory strain and the principal axis of steady state strain. A $d_{33}$ orientation results in little or no degradation of the piezoelectric's electromechanical coupling coefficient even under high steady state stress conditions. It also results in a higher magnitude coupling coefficient than that provided by the $d_{31}$ orientation. A factor of two improvement has been observed and ideally, further improvement is possible. In addition, the modulus (mechanical stiffness) provided by a $d_{33}$ orientation is greater than that provided by a $d_{31}$ orientation.

The stacks 184 of converter components 182 should be maintained under an end to end 190 compressive force. This is because the components in the stack can separate, i.e. crack away, from one another when subjected to significant tensile strain. The compressive force should be applied to each stack, preferably in a manner that avoids introducing any adverse (uneven) stresses which could cause the stack 184 to crack.

One way to put the stack into compression is to first poll the components, then stretch the blade and affix the components to it. Such a process is described above with respect to the d31 orientation. Alternatively, the stack 184 of components 182 may be put into compression by polling it after the energy transformer 180 is bonded to the blade 88. As described above with respect to FIG. 1, piezoelectric material typically expands upon polling. If the energy transformer is affixed to the blade prior to polling, the converter components 182 are restrained from expanding, and instead end up in a state of compression. The magnitude of the polling voltage is preferably adapted to provide the desired piezoelectric characteristics.

Mechanical strain from the blade is preferably transmitted to the stacks primarily through the ends of the stacks rather than the sides of the stacks. This is to avoid adverse bending strains on the stack. The retainer 186 may provide the instrumentality for transmitting forces to the stack ends. If so, the retainer should be somewhat stiffer (more rigid) than the retainers 118, 154, 174 used in the embodiments above, preferably comprising for example a material such as titanium or a rigid plastic such as graphite epoxy composite.

Figure 16:
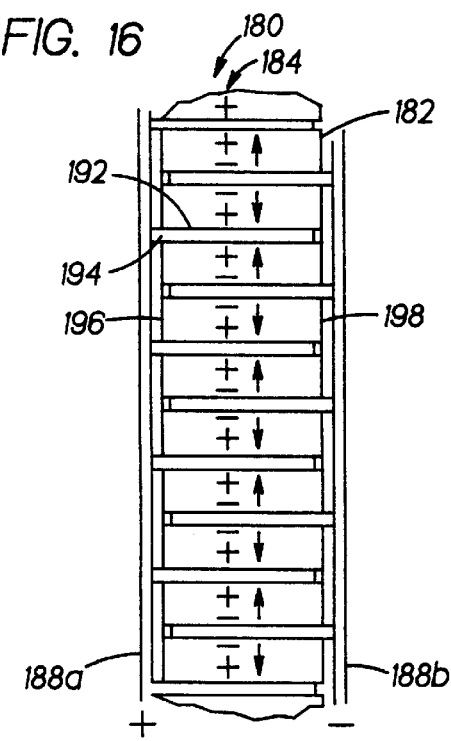
FIG. 16 is a plan view of a portion of the energy transformer of FIG. 15.

Referring now to FIG. 16, the components are preferably oriented such that the poled directions of adjacent components are oppositely directed from one another. Similar to that of adjacent converter component layers in the energy transformer 150 illustrated in FIG. 15. This facilitates electrical interconnection of the converter components 182 in the stack 184. A conductive layer 192 with a tab shaped electrode 194 may be disposed between each of the converter components in the stack. The conductive layer 192 electrically connects like poled electrodes of adjacent components 182. Tabbed electrodes 194 connected to positively polled converter electrodes project from one side 196 of the stack while tabbed electrodes 194 connected to negatively polled converter electrodes project from an opposite side 198 of the stack. The tabs on the one side 196 are electrically interconnected by conductor 188a. Tabs on the opposite side 198 are electrically interconnected by conductor 188b.

Thin layers of adhesive (not shown) may be disposed between the components to bond the stack together. The stack may alternatively be created by properly arranging the converter components and the conductive layers and "firing" it together.

Figure 17:
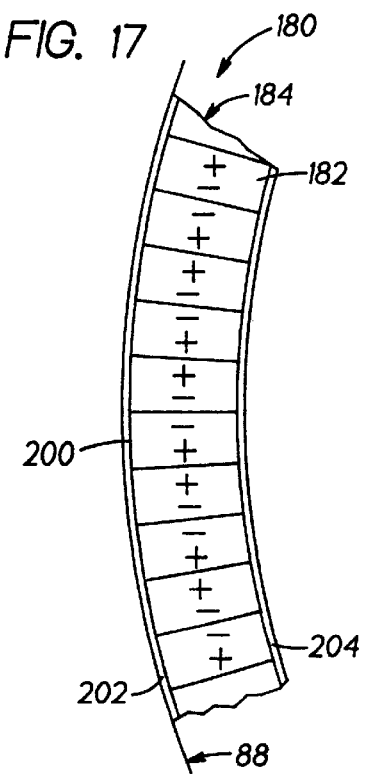
FIG. 17 is a cross section in the direction of 17—17 of a portion of the blade of FIG. 15, and a portion of the energy transformer of FIG. 15.
Figure 18:
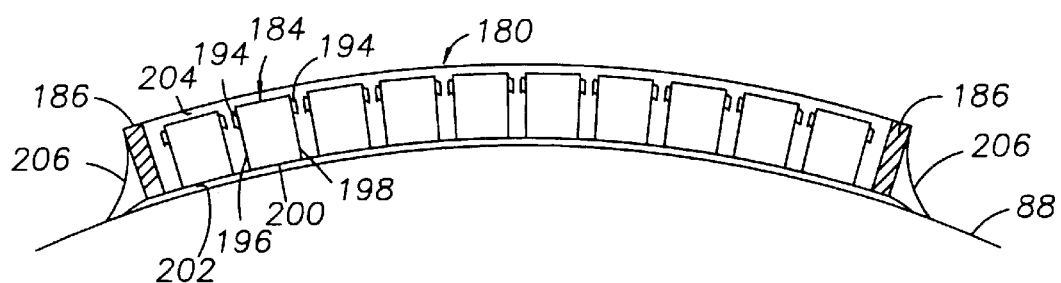
FIG. 18 is a cross section view in the direction of 18—18 of a portion of the blade of FIG. 15 and the energy transformer of FIG. 15.

Referring now to FIGS. 17, 18 a blade side 200 of the energy transformer 180 and stack 184 may have a contour similar to that of the blade surface, which as shown, can have a complex contour (e.g., curved in multiple directions). An adhesive layer 202 may be disposed between the energy transformer 180 and the blade 88. However, as described above, to avoid adverse stress within the stack 184, mechanical strain is preferably transmitted to the stacks 184 primarily through the ends 190 (FIG. 15) of the stack 184 rather than through the blade side 200 of the stack 184. The energy transformer 180 may further comprise an outer polymer layer 204 to provide protection for the components within the transformer 180. The energy transformer 180 is preferably joined together as a single unit using for example, one or more of the methods suggested with respect to the energy transformers 110, 150, 170 described above. The transformer 180 may further include fillets 206 substantially similar to the fillets 134 in the energy transformer 110 (FIG. 8). The edges of the energy transformer 180 may be contoured to alleviate stress concentrations on its corners.

Figure 19:
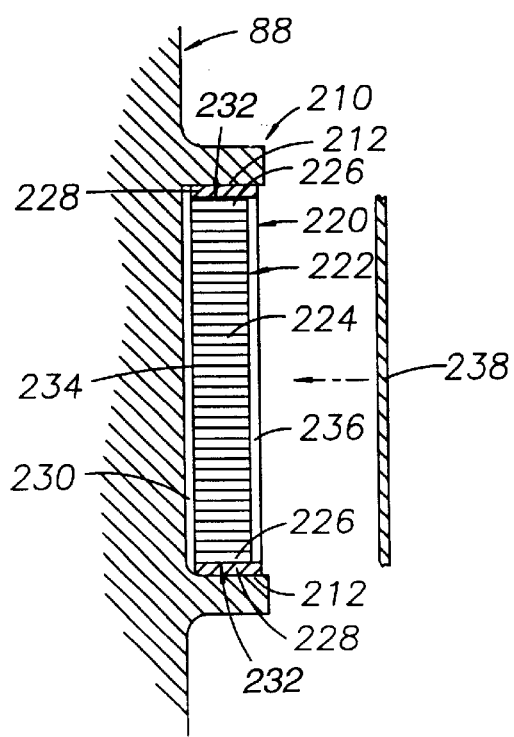
FIG. 19 is a cross section view of a portion of another embodiment of the blade of FIG. 5B and another embodiment of the energy transformer of FIG. 7.

Referring now to FIG. 19, in another embodiment of the damper of the present invention, the blade 88 further comprises a retainer 210 that projects in the circumferential direction 107 (FIG. 6A) from the surface. The retainer 210 preferably comprises one or more inner sides 212 through which radial support may be provided to a proximately located energy transformer 220. The retainer 210 may have a shape similar to that of the retainer 186 (FIGS. 15, 18) whereby it completely encircles the energy transformer 220, although such is not required. The retainer 210 may be formed as an integral flange on the blade as shown, or alternatively, formed separately and attached to the blade.

Although the retainer may be used with an energy transformer that is substantially the same as the energy transformer 180 (FIGS. 15–18), this energy transformer 220 preferably comprises one or more stacks 222 of converter components 224 but no retainer. The stacks 222 are substantially the same as the stacks 184 in the transformer 180 (FIGS. 15–18) except that the converter components 226 at the end of the stack may not be electrically connected to the other components in the stack 222, so that they may electrically isolate the stack 222 from the retainer 210.

As with the stacks 184 in the transformer 180 (FIGS. 15–18), the stack 222 is preferably placed in a state of compression and mechanical strain is preferably transmitted to the stack through ends 232. The retainer 210 can provide the instrumentality for transmitting forces to the ends of the stacks 222. Shims 228 may be disposed between the inner sides 212 of the retainer 210 and the energy transformer 220. The shims 228 should be capable of transmitting vibrational strain and comprise an adhesive material, preferably of a type that expands while it cures.

The energy transformer 220 preferably does not make contact with the radially directed 106 surface of the blade (i.e., bottom of the cavity). An adhesive layer 230 may be disposed between the energy transformer 180 and the blade 88, however, as with the stack 184 of energy transformer 180, mechanical strain is preferably transmitted to the stack 222 primarily through its ends 232 rather than through the blade side 234 of the stack 184. The energy transformer 180 may further comprise an outer polymer layer 236 that is substantially similar to the outer polymer layer 204 of the energy transformer 180. A cover 238 may be provided to help protect the energy transformer during blade handling.

Figure 20:
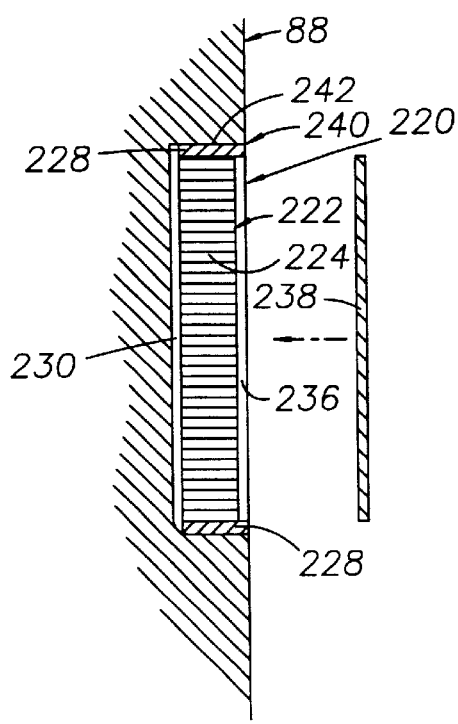
FIG. 20 is a cross section view of a portion of another embodiment of the blade of FIG. 5B and the energy transformer of FIG. 19.

Referring now to FIG. 20, in another embodiment, the blade comprises a retainer 240 that is similar to the retainer 210 (FIG. 19) except that retainer 240 is recessed rather than projecting from the surface of the blade. The retainer 240 has inner sides 242 that are substantially the same as the inner sides 212 of the retainer 210 (FIG. 19). Such recessed retainer 240 is particularly suited for use where the energy transformer 220 would otherwise be in the gas flow 68 path (FIGS. 5A, 5B, 7, 15).

Referring now to FIG. 21, in another embodiment, an energy transformer 250 comprises one or more converter components 252 and a vibration transmitter 254 within a retainer 256 that is affixed to the blade 88. The converter components are preferably located radially outward of the vibration transmitter. Both have freedom to move within the retainer in at least one direction. The retainer 256 is preferably a container or vessel that may be substantially closed.

The converter components 252 may be similar to any converter components discussed above, but preferably comprise a stack 258 that is substantially similar to the stack 184 of converter components 182 in the energy transformer 180 (FIGS. 15–18). As with the stacks 184 in the transformer 180 (FIGS. 15–18), the stack 258 is preferably placed in a state of compression and mechanical strain is preferably transmitted to the stack through ends 260. Communicators 262 disposed on each end 260 of the stack 258 may provide the instrumentality for transmitting forces to the stack 258 without introducing adverse stress, e.g., bending, in the stack 258.

The vibration transmitter 254 preferably comprises an inner structure 264 and a layer 266 of viscoelastic material disposed between the inner structure 264 and the retainer 256. Viscoelastic materials have the quality of being pliable with respect to low frequency strain, e.g. steady state strain, but stiff with respect to high frequency strain, e.g. vibratory strain. The inner structure may comprise a slidable barrier 268 having an outer seal 270 to keep the viscoelastic material within the vibration transmitter 254. The outer seal may be any of various types of seals including but not limited to a flexible metal bellows, an O-ring, or a dam.

The energy transformer 250 is electrically connected to an electrical circuit 272. The electrical circuit 272 is substantially the same as the electrical circuit 112 (FIG. 7), and may be located on or within the energy transformer 250, for example, in a partially hollowed out interior portion of the inner structure 264 as shown, or alternatively, remote from the energy transformer 250.

In operation, vibratory and steady state strains from the blade are imparted on the retainer. These strains are transmitted to the viscoelastic layer which in turn transmits only the vibratory strains to the inner structure. Centrifugal force causes the inner structure to move radially outward into contact with the stack 258. Once in contact, the inner structure has the effect of a centrifugal load on the stack, thereby placing the stack in a state of compression. The mass of the inner structure is preferably preselected so as to result in the desired amount of compression. Vibratory strains are transmitted from the inner structure 264 to the converter components 252. As in the embodiments above, the converter components 252 convert the mechanical strain energy into electrical energy that may be dissipated in the electrical circuit 272.

There are at least two benefits to this embodiment over the embodiments above. First, the principal steady state strain of the blade is not transmitted to (decoupled from) the converter components 252. Thus, little or no tensile strain is imparted on the converter components as a result of the principal steady state strain of the blade. Second, centrifugal loading may be used to provide a compression force on the converter components. This is particular useful in situations where a zero magnitude net tensile strain is desired for the converter components.

Referring now to FIG. 22, in another embodiment of the damper of the present invention, a shroud 280 (link) interconnects (couples) a pair of adjacent fan blades 282, 284. Shrouds are commonly used to provide structural stiffening for the blades in order to help mitigate blade vibration, e.g. circumferential-like directed 107 vibration similar to that described in FIG. 6A. However, unlike the shroud 280 in this embodiment, shrouds commonly used at present do not interconnect adjacent blades, but rather, each blade has its own shroud and the shrouds on adjacent blades make contact with each other midway between the blades. The contacting shroud arrangement results in rubbing that dampens blade vibration. With a shroud, the frequency of the blade vibration is higher than that without a shroud; higher frequency vibrations present less of a problem than lower frequency vibrations. However, the use of a shroud generally results in a lower efficiency for the engine. This reduction in efficiency can typically be lessened if the shroud is positioned at a location 286 closer to the root of the blade, but a shroud at location 286 is typically less effective with respect to vibration than shroud 280.

Referring now to FIG. 23, the shroud 280 has a radially inner surface 288 with one or more recessed retainers 290 each adapted to receive one of one or more energy transformers 292. The retainers 290 are substantially similar to the retainer 240 (FIG. 20) except that the retainer 290 is recessed within the surface 288 of the shroud 280 rather than the surface of the blade. The retainer 290 has inner sides 294 that are substantially the same as the inner sides 242 of the retainer 240 (FIG. 20).

Each of the energy transformers 292 are preferably substantially the same as the energy transformer 220 (FIG. 19) comprising a stack 296 of converter components 298 that are substantially similar to the stacks 222 of the converter components 224. Converter components 300 at ends 302 of the stack 296 may not be electrically connected to the other components in the stack 296, so that they may electrically isolate the stack 296 from the retainer 290.

As with the stacks 222 in the transformer 220 (FIG. 19), the stack 296 is preferably placed in a state of compression and mechanical strain is preferably transmitted to the stack through the ends 302. The retainer 290 can provide the instrumentality for transmitting forces to the ends 302 of the stacks 296. Shims 304 substantially similar to the shims 228 (FIG. 19) may be disposed between the inner sides 294 of the retainer 290 and the energy transformer 292.

The energy transformer 292 preferably does not make contact with the radially directed 106 surface of the blade (i.e., bottom of the cavity). A layer 306 similar to layer 202 in energy transformer 180 (FIGS. 15–18) may be disposed between the energy transformer 292 and the blade 88, but mechanical strain is preferably transmitted to the stack 296 primarily through its ends 302 rather than through the blade side 308 of the stack 296. The energy transformer 292 may further comprise an outer polymer layer 310 that is substantially similar to the outer polymer layer 204 of the energy transformer 180 (FIGS. 15–18). A cover similar to cover 238 (FIG. 19) may be provided to help protect the energy transformer 292.

Referring now to FIG. 24, during fan operation, the circumferential-like directed 107 vibration of the blades 282, 284 imparts a circumferential-like directed 107 strain on the shroud 280. This strain is in turn transmitted, in a $d_{33}$ orientation, to the converter components 298. As with the embodiments above, the converter components 298, convert the mechanical strain energy to electrical energy.

Centripetal force causes the shroud 280 to bend radially 106 outward. Because the shroud 280 interconnects adjacent blades, radially outward bending of the shroud results in compression of the shroud radially inner surface 288 in the circumferential direction 117, i.e., in the shroud's longitudinal axis, and thereby results in a compression force on the stacks 296 of converter components 298 within the energy transformers 292.

A related technique may be used to provide compressive force on the converter components in the other embodiments. For example, compressive force may be provided by locating the converter components at a position on the blade that undergoes suitable bending under steady state conditions.

A monitoring system may be included in any of the above embodiments to verify that damper is operating properly over the life of the turbomachine. The monitoring system could for example monitor vibration, e.g., flutter vibration, and determining whether the magnitude of the vibration is excessive. The monitoring system could also monitor the electrical impedance of the converter components to determine their condition.

Although the damper of the present invention is disclosed as having an energy transformer affixed to an exterior surface of a blade, it will be understood that the energy transformer could alternatively be located on an interior surface of a hollow blade or embedded into the blade, e.g., into the lay up of composite airfoils. It will be recognized that the damper of the present invention may be adapted for use with any type of turbomachine airfoil, including but not limited to any type of blade (rotating airfoil) or vane (non rotating airfoil). It should also be understood that for any particular application, knowledge of the airfoil structural dynamics and the particular forces causing the vibration is needed in order to best design and position the damper components with respect to the airfoil.

A preferred method for determining amounts and placement of the converter components and resistance and inductance values for the electrical circuit 112 (FIG. 19) follows below. The strain energy distribution in the blade for the vibration mode to be damped is determined. This determination, commonly referred to as finite element analysis, typically requires a computer aided vibration analysis program, for example NASTRAN. The regions of the blade having the highest strain energy density are identified and a converter component is placed on these regions so as to maximize strain energy coupling. In some embodiments, somewhat different placements may be necessary due to concerns other than vibration, e.g., aerodynamics, weight. The converter components should have a thickness that satisfies the weight requirements of the embodiment. With the converter components so positioned, the strain energy distribution in the blade for the vibration mode to be damped is determined. These steps are repeated for each of various converter component overall weight, lengths, widths, and thicknesses. For each iteration, data on the total strain energy in the blade and in the converter components is collected. The collected data is used in performing the calculations described below to estimate, for each of the above iterations, optimum values for the inductor and the resistor and the effect of the converter components on the blade. Although the term PZT appears in the definitions and equations below, these equations and definitions are not limited to converter components comprising PZT type materials.

Definitions:

$$Z_{blade} = \frac{k_1}{s} + \frac{k_2}{s}$$

$$Z_{PZT} = \frac{K_{PZT}^{OC}}{s} \frac{1 - k_{ij}^2 + Cs(R + Ls)}{(1 - k_{ij}^2)(1 + Cs(R + Ls))}$$

where $Z_{blade}$ is the blade mechanical impedance.

$k_1$ is the blade stiffness in parallel with the PZT.

$k_2$ is the blade stiffness relatively unaffected by the PZT.

$Z_{PZT}$ is the mechanical impedance of the PZT for a shunted PZT (R in series with L).

$K_{PZT}^{OC}$ is the stiffness of the PZT in an $D_p$, $\mathcal{P}$ circuit.

$k_{ij}$ is the PZT electromechanical coupling coefficient.

C is the clampRd PZT capacitance.

L is the value of the circuit inductor.

R is the value of the damping resistor.

s is Laplace parameter,jD.

$$\frac{x}{x_{st}} = \sqrt{\frac{r^2 a^4 (v^2(1 + \Psi_{ij}^2))^2 + (a^2 - v^2(1 + \Psi_{ij}^2))^2}{r^2 a^4 v^2 (K_{ij}^2 - (v^2 - 1)(1 + \Psi_{ij}^2))^2 + (a^2(1 - v^2) + v^2 (K_{ij}^2 - (v^2 - 1)(1 + \Psi_{ij}^2))]}}$$

$$\eta(v) = \frac{f_r f_c^2 k_{PZT}(v) \eta_{PZT}(v)}{1 + (2 - f_c) f_r k_{PZT}(v) + (f_r k_{PZT}(v))^2 f_c (1 - f_c)(1 + (\eta_{PZT}(v))^2)}$$

where $x/x_{st}$ is the dynamic amplification function, and

η is the blade damping $$f_c = \cfrac{\cfrac{1}{k_1}}{\cfrac{1}{k_1} + \cfrac{1}{k_2}}$$

$$f_r = \frac{k_{PZT}}{k_1}$$

where
  $f_c$ is the fraction of blade compliance in parallel with PZT and is obtained from the results of the finite element analysis performed above, for each of the finite element analysis iterations performed above.
  $f_r$ is the ratio of PZT stiffness to blade stiffness influenced by PZT and is obtained from the results of the finite element analysis performed above, for each of the finite element analysis iterations performed above.

Each iteration of the finite element analysis performed above results in one combination of values for $f_c$ and $f_r$. For each $f_c$, $f_r$ combination, $K^{ij2}$ and $\Psi_{ij}^2$ are calculated where $$K_{ij}^2 = \frac{k_{ij}^2 f_r f_c^2}{(1-k_{ij}^2)(1+f_r f_c)(1+f_r f_c - f_r f_c^2)} \quad \text{and}$$

$$\Psi_{ij}^2 = \frac{k_{ij}^2 f_r f_c (1-f_c)}{(1-k_{ij}^2)(1+f_r f_c - f_r f_c^2)}.$$

$K_{ij}^2$ is a measure of how much of the total strain energy of the system gets converted into electrical energy. $\Psi_{ij}^2$ is a measure of how much blade strain is lost due to the fact that the PZT is influencing only a portion of the blade.
Note that it is typically desired to maximize $K_{ij}^2$ while minimizing $\Psi_{ij}^2$ and total blade weight.

For each combination of $K_{ij}^2$ and $\Psi_{ij}^2$ an optimum R and L are calculated using the equations below:
The optimum values for r and α are:

$$r_{opt} \cong \frac{K_{ij}\sqrt{2+K_{ij}^2+2\Psi_{ij}^2}}{(1+\Psi_{ij}^2)(1+K_{ij}^2+\Psi_{ij}^2)},$$

$$\alpha_{opt} = \sqrt{1+K_{ij}^2+\Psi_{ij}^2}$$

$$R = \frac{r_{opt}}{C\omega_n}$$

$$L = \frac{1}{\alpha_{opt}^2 C\omega_n}.$$

where
  ν is the ratio of forced vibration frequency, $\omega_s$, to the natural modal frequency, $\omega_n$, of the blade with the PZT in open circuit.
  r is a damping tuning parameter, $RC\omega_n$ (R is the resistance, C is the clamped PZT capacitance and $\omega_n$ is the natural modal frequency. α the ratio of electrical resonant frequency, $$\omega_e = \frac{1}{\sqrt{LC}},$$

to the natural modal frequency, $\omega_n$.

Then, using the equation for $x/x_{st}$, i.e., the dynamic amplification function, the amount of vibratory stress reduction provided by that combination of $K_{ij}^2$ and $\Psi_{ij}^2$ and its associated optimum R and L values are calculated. The dynamic amplification function provides an indication of resulting stress in the blade as function of frequency for a given excitation.

The preferred method above was used to obtain optimum predicted parameter values for an embodiment comprising an experimental fan blade and a damper of PZT components bonded to the blade. Testing was then performed to empirically determine optimum values, and the predicted values and the empirically determined values are listed below.

From NASTRAN finite element analysis:
  $f_c$=0.536
  $f_r$=0.633
The appropriate $k_{ij}$ coupling constant for PZT 5A used in this embodiment:
  $k_{31}$=−0.34.
Predicted optimum values using preferred process above:
  L=3.84 Henries
  R=825 Ohms
  η(ν=1)=0.070.
Empirically determined optimal values:
  R=708 Ohms
  L=3.78–3.85 Henries
  The blade damping (loss factor):
  0.08–0.09.

The closeness between the predicted and the empirically determined values demonstrate that damping can be very well predicted by analytical and computer modelling and that damping optimization can be obtained by minimizing PZT weight, size, and thickness through proper placement procedures.

The reason for the slightly higher than predicted damping is that the PZT on is being stretched both longitudinally and also, to a lesser extent, transversely. Hence there is both a $d_{31}$ and $d_{32}$ component which would effectively increase the $k_{31}$ coupling constant. This would lead to an increased effective damping.

While disclosed with respect to passive damping, the damper of the present invention may also be employed in an active control scheme, wherein, for example, a vibration sensor detects vibration and a control circuit applies a voltage to the converter components to induce strain that opposes the detected vibration. An active control scheme generally requires a sensor, a signal processor, an actuator and a power source. However, an active embodiment may not require as large a quantity of converter component material as that required by a passive embodiment.

Lastly, it should be obvious to one skilled in the art that the energy transformer need only comprise the converter components.

The converter components may comprise any suitable material. This includes but is not limited to classes of materials generally referred to as piezoelectrics, piezomagnetics, ferroelectric, and magnetostrictive. Of particular note within the class of piezoelectrics are piezoelectric ceramics including lead zirconate titanate (PZT) and composites of such, quartz, organic compounds, tormeline, polyvinylidene flouride (PVDF).

Although the present invention is disclosed with respect to embodiments for use with a fan blade, the present invention has general applicability to any turbomachine component that experiences vibratory stress, and provides particular advantages for use with components that must endure high steady state stress. Components having high steady state stress includes but is not limited to not only rotating airfoils but also vanes, which have high stress due to the velocity of the gas path, and nacelle components and other components that provide air management surfaces in the engine.

While the particular invention has been described with reference to particular embodiments, this description is not meant to be construed in a limiting sense. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An apparatus for passive damping of vibratory strain in a turbomachine component that experiences high steady state strain, the vibratory strain having associated with it mechanical energy, the apparatus comprising:
   a mechanical-to-electromagnetic energy transformer mechanically coupled to the component, said energy transformer receiving mechanical energy associated with the vibratory strain of the component and producing, from said mechanical energy, electromagnetic energy; and
   an electromagnetic circuit electromagnetically coupled to said energy transformer, said circuit receiving electromagnetic energy, from said energy transformer, that is then dissipated through passive damping.

2. The apparatus of claim 1 disposed in an engine wherein the engine has a gas path and the component comprises an air management surface for the gas path.

3. The apparatus of claim 1 wherein the component is an airfoil.

4. The apparatus of claim 1 wherein the component is a rotating airfoil.

5. The apparatus of claim 4 wherein said mechanical-to-electromagnetic energy transformer is substantially compliant prior to affixing it to the component, said mechanical-to-electromagnetic energy transformer comprises a converter component having a shape that is sheet-like, and said mechanical-to-electromagnetic energy transformer is affixed to the component in such a manner as to provide compressive force to said energy transformer.

6. The apparatus of claim 4 wherein the component has an integral retainer and said mechanical-to-electromagnetic energy transformer is located within said retainer, said mechanical-to-electromagnetic energy transformer comprises a plurality of converter component arranged in a stack, and said mechanical-to-electromagnetic energy transformer is affixed to the component in such a manner as to provide compressive force to said energy transformer.

7. The apparatus of claim 4 wherein said electromagnetic circuit comprises an electrical circuit and said electromagnetic coupling of said mechanical-to-electromagnetic energy transformer and said electrical circuit comprises electrical coupling, said mechanical-to-electromagnetic energy transformer comprise a piezoelectric material, the component has a surface and said mechanical-to-electromagnetic energy transformer is affixed to said surface, and said mechanical-to-electromagnetic energy transformer is affixed to the component in such a manner as to provide compressive force to said energy transformer when the component is subjected to high steady state stress.

8. The apparatus of claim 1 wherein said electromagnetic circuit comprises an electrical circuit and coupling of said mechanical-to-electromagnetic energy transformer and said electrical circuit comprises electrical coupling.

9. The apparatus of claim 1 wherein said mechanical-to-electromagnetic energy transformer comprise a piezoelectric material.

10. The apparatus of claim 1 wherein said electromagnetic energy is dissipated electrically.

11. The apparatus of claim 1 wherein said mechanical-to-electromagnetic energy transformer is compliant prior to affixing it to the component.

12. The apparatus of claim 1 wherein the component has a surface and said mechanical-to-electromagnetic energy transformer is affixed to said surface.

13. The apparatus of claim 12 wherein the turbomachine has a gas path and said mechanical-to-electromagnetic energy transformer is affixed to a location of said surface that is in said gas path.

14. The apparatus of claim 1 wherein the component is an airfoil having a shroud and said mechanical-to-electromagnetic energy transformer is affixed to said shroud.

15. The apparatus of claim 1 wherein the component has an integral retainer and said mechanical-to-electromagnetic energy transformer is located within said retainer.

16. The apparatus of claim 1 wherein the energy transformer comprises a retainer having ends affixed to the component and said retainer receives mechanical energy primarily through said ends.

17. The apparatus of claim 1 wherein said mechanical-to-electromagnetic energy transformer comprises a converter component having a shape that is sheet-like.

18. The apparatus of claim 1 wherein said mechanical-to-electromagnetic energy transformer comprises a plurality of converter component arranged in a stack.

19. The apparatus of claim 1 wherein said mechanical-to-electromagnetic energy transformer comprises a viscoelastic material and receives mechanical energy from the component through said viscoelastic material.

20. The apparatus of claim 1 wherein said mechanical-to-electromagnetic energy transformer is affixed to the component in such a manner as to provide compressive force to said energy transformer.

21. The apparatus of claim 20 wherein said manner comprises applying a force to the component causing the component to bend, said mechanical-to-electromagnetic energy transformer is then affixed to the component, and said force is then removed.

22. The apparatus of claim 1 wherein said mechanical-to-electromagnetic energy transformer is affixed to the component in such a manner as to provide compressive force to said energy transformer when the component is subjected to high steady state stress.

23. A method for passive damping of vibratory strain in a turbomachine component that experiences high steady state strain, the vibratory strain having associated with it mechanical energy, the method comprising:
   providing a mechanical-to-electromagnetic energy transformer mechanically coupled to the component, said energy transformer receiving mechanical energy associated with the vibratory strain of the component and producing, from said mechanical energy, electromagnetic energy; and
   providing an electromagnetic circuit electromagnetically coupled to said energy transformer, said circuit receiving electromagnetic energy, from said energy transformer, that is then dissipated through passive damping.

24. An apparatus for damping of vibratory strain in a turbomachine component that experiences high steady state strain, the component having a surface, the vibratory strain having associated with it mechanical energy, the apparatus comprising:
    a mechanical-to-electromagnetic energy transformer mechanically coupled to the surface of the component, said energy transformer receiving mechanical energy associated with the vibratory strain of the component and producing, from said mechanical energy, electromagnetic energy; and
    an electromagnetic circuit electromagnetically coupled to said energy transformer, said circuit receiving electromagnetic energy, from said energy transformer, that is then dissipated through passive damping.

25. The apparatus of claim 24 wherein the engine has a gas path and the component comprises an air management surface for the gas path.

26. The apparatus of claim 24 wherein the component is an airfoil.

27. The apparatus of claim 24 wherein the component is a rotating airfoil.

28. The apparatus of claim 27 wherein said mechanical-to-electromagnetic energy transformer is substantially compliant prior to affixing it to the component, said mechanical-to-electromagnetic energy transformer comprises a converter component having a shape that is sheet-like, and said mechanical-to-electromagnetic energy transformer is affixed to the component in such a manner as to provide compressive force to said energy transformer.

29. The apparatus of claim 27 wherein the component has an integral retainer and said mechanical-to-electromagnetic energy transformer is located within said retainer, said mechanical-to-electromagnetic energy transformer comprises a plurality of converter component arranged in a stack, and said mechanical-to-electromagnetic energy transformer is affixed to the component in such a manner as to provide compressive force to said energy transformer.

30. The apparatus of claim 27 wherein said electromagnetic circuit comprises an electrical circuit and said electromagnetic coupling of said mechanical-to-electromagnetic energy transformer and said electrical circuit comprises electrical coupling, said mechanical-to-electromagnetic energy transformer comprise a piezoelectric material, the component has a surface and said mechanical-to-electromagnetic energy transformer is affixed to said surface, and said mechanical-to-electromagnetic energy transformer is affixed to the component in such a manner as to provide compressive force to said energy transformer when the component is subjected to high steady state stress.

31. The apparatus of claim 24 wherein said electromagnetic circuit comprises an electrical circuit and said electromagnetic coupling of said mechanical-to-electromagnetic energy transformer and said electrical circuit comprises electrical coupling.

32. The apparatus of claim 24 wherein said mechanical-to-electromagnetic energy transformer comprise a piezoelectric material.

33. The apparatus of claim 24 wherein said electromagnetic energy is dissipated electrically.

34. The apparatus of claim 24 wherein said mechanical-to-electromagnetic energy transformer is compliant prior to affixing it to the component.

35. The apparatus of claim 24 wherein the turbomachine has a gas path, said mechanical-to-electromagnetic energy transformer is affixed to a location of a surface of the component and said surface that is not in said gas path.

36. The apparatus of claim 24 wherein the component is an airfoil having a shroud and said mechanical-to-electromagnetic energy transformer is affixed to said shroud.

37. The apparatus of claim 24 wherein the component has an integral retainer and said mechanical-to-electromagnetic energy transformer is located within said retainer.

38. The apparatus of claim 24 wherein the energy transformer comprises a retainer having ends affixed to the component and said retainer receives mechanical energy primarily through said ends.

39. The apparatus of claim 24 wherein said mechanical-to-electromagnetic energy transformer comprises a converter component having a shape that is sheet-like.

40. The apparatus of claim 24 wherein said mechanical-to-electromagnetic energy transformer comprises a plurality of converter component arranged in a stack.

41. The apparatus of claim 24 wherein said mechanical-to-electromagnetic energy transformer comprises a viscoelastic material and receives mechanical energy from the component through said viscoelastic material.

42. The apparatus of claim 24 wherein said mechanical-to-electromagnetic energy transformer is affixed to the component in such a manner as to provide compressive force to said energy transformer.

43. The apparatus of claim 40 wherein said manner comprises applying a force to the component causing the component to bend, said mechanical-to-electromagnetic energy transformer is then affixed to the component, and said force is then removed.

44. The apparatus of claim 24 wherein said mechanical-to-electromagnetic energy transformer is affixed to the component in such a manner as to provide compressive force to said energy transformer when the component is subjected to high steady state stress.

45. An method for damping of vibratory strain in a turbomachine component that experiences high steady state strain, the component having a surface, the vibratory strain having associated with it mechanical energy, the apparatus comprising:
    providing a mechanical-to-electromagnetic energy transformer mechanically coupled to the surface of the component, said energy transformer receiving mechanical energy associated with the vibratory strain of the component and producing, from said mechanical energy, electromagnetic energy; and
    providing an electromagnetic circuit electromagnetically coupled to said energy transformer, said circuit receiving electromagnetic energy, from said energy transformer, that is then dissipate through passive damping.

* * * * *